United States Patent
Romo et al.

(10) Patent No.: US 10,510,117 B1
(45) Date of Patent: Dec. 17, 2019

(54) HIGH PERFORMANCE STOCK SCREENER VISUALIZATION TECHNOLOGY USING PARALLEL COORDINATES GRAPHS

(71) Applicant: Scottrade, Inc., St. Louis, MO (US)

(72) Inventors: Justin Ryan Romo, Clayton, MO (US); Jessica Lynn Inman Birkhead, St. Louis, MO (US); Daniel Edward Dean, Lake Saint Louis, MO (US); Oscar Javier Pineda-Madrid, II, St. Charles, MO (US); Murat Sanli, Kirkwood, MO (US); Lainey Lauren Schifferdecker, Columbia, IL (US); Virgil Michael Scott, Lake Saint Louis, MO (US); Andrew Joseph Stafford, St. Charles, MO (US); Scott Michael Welzbacher, St. Louis, MO (US)

(73) Assignee: Scottrade, Inc., St. Louis, MO (US)

( * ) Notice: Subject to any disclaimer, the term of this patent is extended or adjusted under 35 U.S.C. 154(b) by 831 days.

(21) Appl. No.: 14/665,804

(22) Filed: Mar. 23, 2015

(51) Int. Cl.
*G06Q 40/06* (2012.01)

(52) U.S. Cl.
CPC .................... *G06Q 40/06* (2013.01)

(58) Field of Classification Search
CPC ........................................ G06Q 40/06
USPC ........................................ 705/36 R
See application file for complete search history.

(56) References Cited

U.S. PATENT DOCUMENTS

| | | | | |
|---|---|---|---|---|
| 5,917,500 A * | 6/1999 | Johnson | ............... | G06T 11/206 345/440 |
| 6,879,325 B1 * | 4/2005 | Brooks | ............... | G01D 7/02 345/440 |
| 7,249,032 B1 * | 7/2007 | Close | ............... | G06Q 20/201 705/20 |
| 7,249,033 B1 * | 7/2007 | Close | ............... | G06Q 10/063 705/7.35 |
| 7,659,895 B2 * | 2/2010 | Kandogan | ............... | G06T 11/206 345/440 |
| 8,346,682 B2 * | 1/2013 | Steed | ............... | G06T 11/206 706/11 |
| 2005/0246255 A1 * | 11/2005 | Rousseau | ............... | G06Q 40/00 705/35 |
| 2005/0267836 A1 * | 12/2005 | Crosthwaite | ............... | G06Q 40/00 705/37 |
| 2006/0195345 A1 * | 8/2006 | Close | ............... | G06Q 10/04 705/20 |

(Continued)

OTHER PUBLICATIONS

S.Savoska, S.Loskovska, Parallel Coordinates as Tool of Exploratory Data Analysis, Nov. 24-26, 2009, 17th Telecommunications forum TELFOR 2009—(see pp. 1345 and 1346).*

(Continued)

*Primary Examiner* — Olabode Akintola
*Assistant Examiner* — Paul R Kloberg
(74) *Attorney, Agent, or Firm* — Harness, Dickey & Pierce, P.L.C.

(57) ABSTRACT

Various techniques are disclosed whereby computer technology such as a client-server arrangement is specially configured to generate and display parallel coordinates graphs of financial instrument data on a display screen. In an example embodiment, progressive rendering techniques can be used to improve performance by reducing a perception of slowness with respect to the loading of a parallel coordinates graph.

23 Claims, 16 Drawing Sheets

(56) References Cited

U.S. PATENT DOCUMENTS

| | | | |
|---|---|---|---|
| 2008/0071700 A1* | 3/2008 | Catalano-Johnson | ............... G06Q 40/04 705/36 R |
| 2009/0019305 A1* | 1/2009 | Genetski | ............... G06Q 40/00 714/2 |
| 2009/0037313 A1* | 2/2009 | Tully | ............... G06Q 40/00 705/35 |
| 2010/0191678 A1* | 7/2010 | Steed | ............... G06T 11/206 706/11 |
| 2010/0211519 A1* | 8/2010 | Giannetti | ............... G06Q 40/04 705/36 R |
| 2010/0228661 A1* | 9/2010 | Lutnick | ............... G06Q 40/00 705/37 |
| 2013/0091252 A1* | 4/2013 | Pizzorni | ............... G06Q 10/10 709/219 |
| 2013/0304604 A1* | 11/2013 | Hoffman | ............ G06Q 30/0621 705/26.5 |
| 2014/0379561 A1* | 12/2014 | Amancherla | ...... G06Q 20/4016 705/39 |
| 2015/0073961 A1* | 3/2015 | Cristoforo | ........... G06F 3/04815 705/37 |
| 2015/0228027 A1* | 8/2015 | Block | ................ G06Q 40/06 705/36 R |
| 2016/0048936 A1* | 2/2016 | Perkowski | ........... G06Q 10/063 705/310 |
| 2016/0247233 A1* | 8/2016 | Page | ..................... G06Q 40/06 |

OTHER PUBLICATIONS

"Parallel Coordinates", Wikipedia, the Free Encyclopedia, 6 pages, <http://en.wikipeida.org/wiki/Parallel_coordinates>, accessed Mar. 13, 2015.

"Canvas Element", Wikipedia, the Free Encyclopedia, 5 pages, <http://en.wikipedia.ord/wiki/Canvas_element>, accessed Mar. 13, 2015.

\* cited by examiner

| Financial Instrument Identifier (204) | Criteria 1 (206₁) | Criteria 2 (206₂) | ... | Criteria n (206ₙ) |
|---|---|---|---|---|
| ABC | $5.34 | 4.1 | ... | 73% |
| BCD | $16.52 | 3.2 | ... | 56% |
| ... | ... | ... | ... | ... |
| XYZ | $12.47 | 7.8 | ... | -4% |

```
privates.lineRenderRate = 100;
privates.foregroundQueue = screenerGraphQueue(privateMethods.renderForegroundLine);
privates.foregroundQueue.rate(privates.lineRenderRate);
privates.backgroundQueue = screenerGraphQueue(privateMethods.renderBackgroundLine);
privates.backgroundQueue.rate(privates.lineRenderRate);

privates.foregroundCanvas = document.getElementById('foreground').getContext('2d');
privates.backgroundCanvas = document.getElementById('background').getContext('2d');

renderForegroundLine: function (d) {
        privates.foregroundCanvas.strokeStyle = d[0];
        privates.foregroundCanvas.lineWidth = d[1];
        privateMethods.renderLine(d[2], privates.foregroundCanvas);
},
renderBackgroundLine: function (d) {
        privates.backgroundCanvas.strokeStyle = d[0];
        privates.backgroundCanvas.lineWidth = d[1];

privateMethods.renderLine(d[2], privates.backgroundCanvas);
},
renderLine: function (d, ctx) {
        ctx.beginPath();
        ctx.lineCap = "round";

if (privates.dimensions.length > 2) {
                var flatPoints = [];
                var tension = 0.125;
                privates.dimensions.map(function (p) {
                        flatPoints.push(privates.x(p));
                        flatPoints.push(privates.y[p](d[p].v));
                });

var controlPoints = [];
                var n = flatPoints.length;

for (var c = 0; c < n - 4; c += 2) {
                        controlPoints = controlPoints.concat(privateMethods.getControlPoints(flatPoints[c],
flatPoints[c + 1], flatPoints[c + 2], flatPoints[c + 3], flatPoints[c + 4], flatPoints[c + 5], tension));
                } for (var i = 2; i < n - 5; i += 2) {
                        ctx.beginPath();
                        ctx.moveTo(flatPoints[i], flatPoints[i + 1]);
                        ctx.bezierCurveTo(controlPoints[2 * i - 2], controlPoints[2 * i - 1], controlPoints[2 * i],
controlPoints[2 * i + 1], flatPoints[i + 2], flatPoints[i + 3]);
                        ctx.stroke();
                        ctx.closePath();
                } ctx.beginPath();
                ctx.moveTo(flatPoints[0], flatPoints[1]);
                ctx.quadraticCurveTo(controlPoints[0], controlPoints[1], flatPoints[2], flatPoints[3]);
                ctx.stroke();
                ctx.closePath();

ctx.beginPath();
                ctx.moveTo(flatPoints[n - 2], flatPoints[n - 1]);
                ctx.quadraticCurveTo(controlPoints[2 * n - 10], controlPoints[2 * n - 9], flatPoints[n - 4], flatPoints[n -
3]);
                ctx.stroke();
                ctx.closePath();
```

Figure 19A

```
            } else {
                    privates.dimensions.map(function (p, index) {
                            var x = privates.x(p);
                            var y = privates.y[p](d[p].v);
                            if (index == 0) {
                                    ctx.moveTo(x, y);
                            } else {
                                    ctx.lineTo(x, y);
                            }
                    });
                    ctx.stroke();
            }
    },
    getControlPoints: function (x0, y0, x1, y1, x2, y2, t) {
            var d01 = Math.sqrt(Math.pow(x1 - x0, 2) + Math.pow(y1 - y0, 2));
            var d12 = Math.sqrt(Math.pow(x2 - x1, 2) + Math.pow(y2 - y1, 2));
            var fa = t * d01 / (d01 + d12);
            var fb = t - fa;
            var p1X = x1 + fa * (x0 - x2);
            var p1Y = y1 + fa * (y0 - y2);
            var p2X = x1 - fb * (x0 - x2);
            var p2Y = y1 - fb * (y0 - y2);
            return [p1X, safeHeight(p1Y), p2X, safeHeight(p2Y)];

function safeHeight(y) {
                    if (y < 0) {
                            return 0;
                    } else if (y > privates.foregroundCanvas.height) {
                            return privates.foregroundCanvas.height;
                    } else {
                            return y;
                    }
            }
    },
```

Figure 19B

HIGH PERFORMANCE STOCK SCREENER VISUALIZATION TECHNOLOGY USING PARALLEL COORDINATES GRAPHS

INTRODUCTION

Stock traders often suffer from acute cases of information overload because the amount of information available about stocks is overwhelming. A significant challenge faced by traders is filtering the "signal" (relevant stock information) from the "noise" (irrelevant stock information). Further complicating this situation is that different stock traders have different opinions about what stock information is relevant or irrelevant.

In an effort to provide stock traders with a tool for filtering signal from noise, stock screener technologies have been developed. Through these stock screener tools, a user can define the criteria by which stocks will be filtered (e.g., criteria such as dividend yield, return on earnings, percentage changes over specified time periods, etc.) so that the user can identify which stocks match the user-defined criteria. However, the inventors have found that these existing stock screener tools are deficient in a number of respects because they lack effective visualization technology. For example, typical stock screeners display results in a table format, which the inventors believe fails to effectively communicate important aspects of the stock screener results.

In an effort to solve this shortcoming the art, the inventors disclose a practical application of computer technology that generates parallel coordinates graphs to fundamentally change how the results of stock screen filters are presented to users. Through parallel coordinates graphs as described herein, users are provided with a more holistic view of a group of financial instruments with respect to a number of criteria, where this parallel coordinates view visually shows various interrelationships between the subject financial instrument criteria that prior stock screener technologies were unable to effectively communicate. For example, through a parallel coordinates graph, a user can quickly, intuitively, and comparatively evaluate large numbers of stocks with respect to multiple criteria. As shown by example embodiments shown herein, parallel coordinates graphs quickly inform users how various stocks may "bunch" around certain data value ranges with respect to certain criteria. The parallel coordinates graph also permits a user to quickly identify outlier cases where stocks may exhibit criteria data values that fall far away from the "bunched" majority of stocks. Users can then evaluate the circumstances regarding such outlier cases to help their trading decisions. By contrast, conventional table displays of stock screener results fail to quickly communicate such potentially meaningful information to users.

In accordance with an example embodiment, a networked client-server computer architecture is used to make a database of financial instrument data available to one or more client computers for the creation and display of a parallel coordinates graph of the financial instrument data with respect to a plurality of financial instruments and a plurality of criteria for those financial instruments. As used herein, a "financial instrument" refers to a contract representing equity ownership, debt or credit, typically in relation to a corporate or governmental entity, wherein the contract is saleable. Examples of "financial instruments" include stocks, bonds, commodities, currency traded on currency markets, etc. but would not include cash or checks in the sense of how those items are used outside financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein).

In an example embodiment, an application such as a web application can be provided by a server to a client computer for execution by the client computer to render the parallel coordinates graph on a display screen of the client computer. Such an application may include a parallel coordinates plotting module and a rendering module.

The inventors have also observed that in many instances, the parallel coordinates graphs that are rendered by client computers for large pools of financial instruments and criteria suffer from a performance problem whereby users of the client computer will perceive slow loading due to the large number of lines that need to be included in the parallel coordinates graph. As a technical solution to this technical problem, the inventors disclose an example embodiment where progressive rendering is employed such that only portions of the parallel coordinates graph are rendered by the client computer on the display screen at a time. This permits the user to see the partially rendered parallel coordinates graph rather than waiting until the entire parallel coordinates graph has been rendered. In an example progressive rendering technique, portions of the parallel coordinates graph are rendered at timed intervals until the complete parallel coordinates graph has been rendered. For example, the application can be configured to cause the client computer to progressively add the lines corresponding to each financial instrument onto the parallel coordinates graph on a financial instrument-by-financial instrument basis.

The inventors also disclose an example embodiment where client-side caching of financial instrument data is used to reduce the network traffic that is required to generate parallel coordinates graphs as well as reduce the load on the server.

These and other features and advantages of the present invention will be apparent to those having ordinary skill in the art upon review of the teachings in the following description and drawings.

BRIEF DESCRIPTION OF THE DRAWINGS

FIGS. 6-18B depict examples of graphical user interfaces (GUIs) for display on client computers in accordance with example embodiments.

FIGS. 19A and 19B show an example code snippet that illustrates how an HTML5 <canvas> element may be used in connection with an example embodiment.

DETAILED DESCRIPTION OF EXAMPLE EMBODIMENTS

Figure 1:
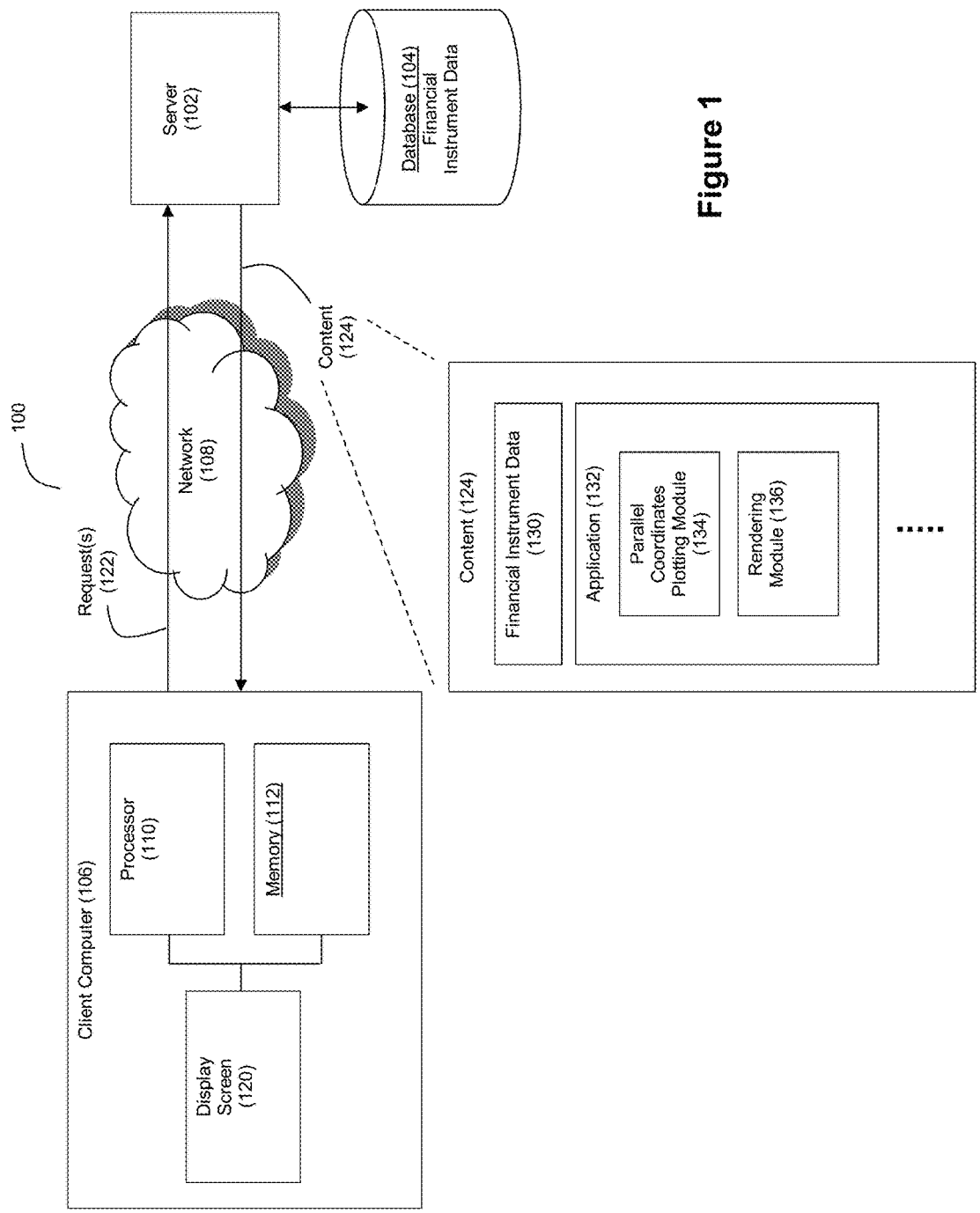
FIG. 1 depicts an example networked client-server system in accordance with an example embodiment.

FIG. 1 depicts a computing system 100 in accordance with an example embodiment. The computing system 100 may include a server 102, a database 104 for access by the server 102, and an application 132 for execution by a client computer 106. The server 102 and the client computer 106 may communicate with each other via a network 108.

Any server computer system capable of performing the operations described herein for the server 102 may serve as server 102. It should be understood that the server 102 may take the form of one or more such suitable servers.

The database 104 may take the form of one or more physical memories in which data structures can be stored in a manner suitable for the financial instrument data described herein. The financial instrument data as described herein can be stored as a plurality of data structures within database 104. It should be understood that a data structure is a physical manifestation of information organized within a computing system. Examples of data structures may include data files, records, tables, arrays, trees, objects, and the like.

The network 108 may be any network capable of communicating information between computers, including but not limited to wired and wireless networks, the Internet, cellular networks, and any combinations thereof.

The client computer 106 may take the form of any computer capable of communicating with the server 102 via network 108 and presenting the GUIs as described herein. Furthermore, while the example of FIG. 1 shows a single client computer 106 in system 100, it should be understood that large numbers of client computers 106 may access the server 102 via network 108. Examples of client computers 106 may include desktop computers/workstations, tablet computers, and smart phones. The client computer 106 may include a processor 110 in cooperation with a memory 112 and a display screen 120. It should be well understood that client computer 106 may also include a number of other components, such as an input component (e.g., keyboard, mouse, touchscreen, etc.), a network interface component, and others.

The application 132 may include a parallel coordinates plotting module 134 and a rendering module 136. Examples for how such modules can be implemented within application 132 are described herein. The application 132 can take the form of software embodied as a plurality of processor-executable instructions resident on a non-transitory computer-readable storage medium. In an example embodiment, the application 132 can be a web application. Furthermore, in an example embodiment, the web application can be implemented as a JavaScript web application.

In operation, the example system 100 of FIG. 1 can be operated such that a user of the client computer 106 submits requests 122 to the server 102 via network 108. These requests 122 are requests for stock screen visualizations that include parallel coordinates graphs which plot a plurality of financial instruments with respect to a plurality of criteria. Based on these requests 122, the server 102 interacts with the database 104 to retrieve data values for the criteria of interest with respect to the financial instruments of interest. The server 102 then transfers content 124 from its memory to the client computer 106 in response to these requests. The content 124 may include the retrieved financial instrument data 130 together with the application 132. Upon receipt of the content 124, the client computer 106 loads the content 124 into its memory 112. Processor 110 executes the application 132 and interacts with the display screen 120 to cause the display screen to present a parallel coordinates graph of the financial instrument data 130 to the user. In an example embodiment, the processor 110 executes a browser application (e.g., a web browser), and the application 132 is executed from within the browser.

Figures 2, 3:
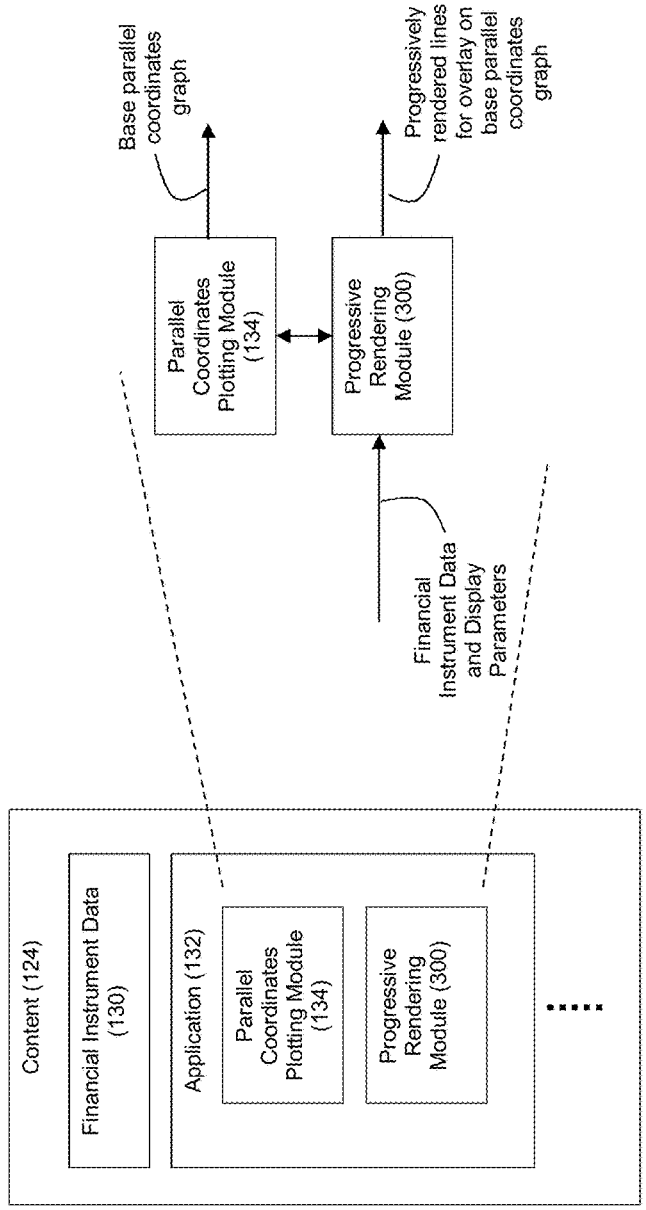
FIG. 2 depicts example data structures for financial instrument data in accordance with an example embodiment.
FIG. 3 depicts an example arrangement for an application to be executed by a client computer in accordance with an example embodiment.

FIG. 2 shows an example data structure 200 for financial instrument data that can be present in database 104. In this example, the data structure is arranged as a database table, although it should be understood that other data structure arrangements could be used if desired by a practitioner. Each row 202 in the table corresponds to a different financial instrument, and the financial instrument data can include a number of associated fields, such as a field for a financial instrument identifier 204 (e.g., a stock symbol) and a plurality of fields associated with different financial instrument criteria $206_1$, $206_2$, ... $206_n$ for that financial instrument. The criteria fields $206_i$ can be populated with criteria data values for the associated financial instrument. Examples of criteria that can be associated with criteria fields $206_i$ may include criteria such as price, dividend yield, earnings per share (EPS), return on assets (ROA), rate of return (ROR), and price/earnings (P/E) ratio (among many other possibilities (examples of which are described below)). The database 104 can periodically populated with updated criteria data values for the various financial instruments (e.g., overnight updates). In an example embodiment, many of the criteria data values can remain static throughout a trading day. However, it should be understood that this need not be the case.

Figure 8:
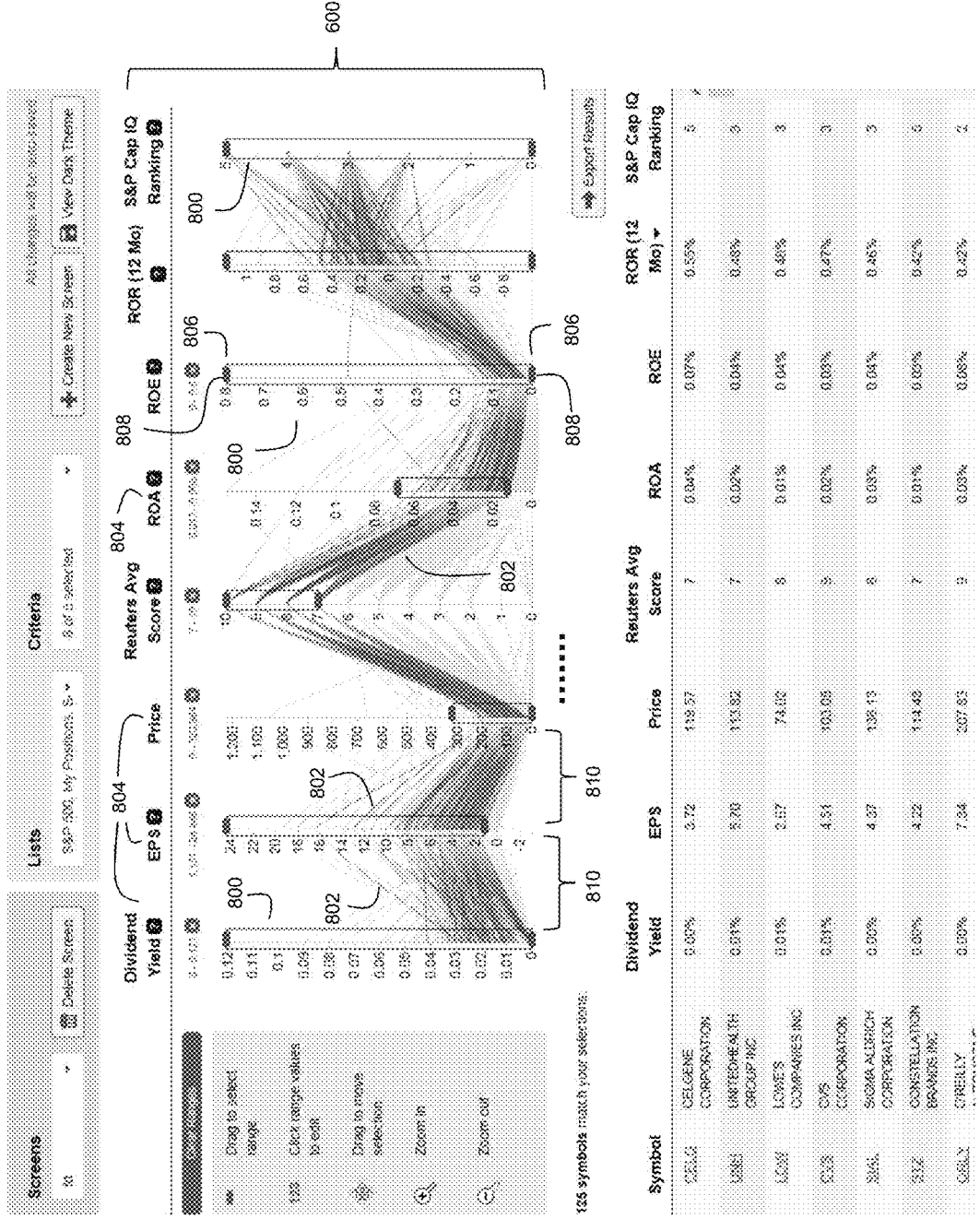

FIG. 8 shows an example parallel coordinates graph that can be presented to a user through a section 600 of a graphical user interface (GUI) that is displayed via display screen 120. The parallel coordinates graph includes a plurality of parallel axes 800 that are spaced from each other via spacing 810. Each axis 800 corresponds to a different financial instrument criteria 804 as shown in FIG. 8. Thus, in the example of FIG. 8, the leftmost axis 800 corresponds to a dividend yield criteria, the second leftmost axis 800 corresponds to an EPS criteria, and so on until the rightmost axis 800 which corresponds to an S&P Cap IQ ranking criteria.

Each parallel axis 800 has a long dimension, and each axis 800 has ends 806 located at opposite ends of its long dimension. The long dimension for each axis 800 defines a range scale of values for the criteria associated with that axis 800. Thus, in the example of FIG. 8, the axis 800 for the dividend yield criteria exhibits a range scale from 0 to 0.12. Each parallel axis 800 can be displayed in any of a number of graphical formats. For example, the parallel axes 800 can be shown as bars, lines or other shapes that are capable of suitably exhibiting a long dimension on which a range scale of data values can be presented.

Each line 802 shown in the parallel coordinates graph corresponds to a financial instrument and serves to plot the criteria data values for that financial instrument with respect to each parallel axis 800. In the example of FIG. 8, each line 802 for a financial instrument includes a first end point and a second end point, where the first end point is a criteria data value for that financial instrument with respect to a first criteria and the second end point is a criteria data value for that financial instrument with respect to a second criteria, and where the first and second criteria are criteria corresponding to adjacent parallel axes 800. Thus, in an example where the parallel coordinates graph includes 8 parallel axes for 8 different criteria, the parallel coordinates graph will include 7 lines 802 for a given financial instrument (a first line 802 extending from the axis 800 for Criteria 1 to the adjacent parallel axis for Criteria 2, a second line 802 extending from the axis 800 for Criteria 2 to the adjacent parallel axis for Criteria 3, a third line 802 extending from the axis 800 for Criteria 3 to the adjacent parallel axis for Criteria 4, a fourth line 802 extending from the axis 800 for Criteria 4 to the adjacent parallel axis for Criteria 5, a fifth line 802 extending from the axis 800 for Criteria 5 to the adjacent parallel axis for Criteria 6, a sixth line 802 extending from the axis 800 for Criteria 6 to the adjacent parallel axis for Criteria 7, and a seventh line 802 extending from the axis 800 for Criteria 7 to the adjacent parallel axis for Criteria 8).

While the example of FIG. 8 shows an arrangement for the parallel coordinates graph where the parallel axes 800 are vertical and spaced from each other laterally, it should be understood that other arrangements could be used if desired by a practitioner. For example, the parallel axes 800 could be horizontal with longitudinal spacing therebetween (e.g., a 90 degree rotation). Also, while the example of FIG. 8 shows that the spacing 810 between each set of parallel axes 800 is relatively equal, this need not be the case if desired by a practitioner.

As shown in FIG. 1, application 132 may include a parallel coordinates plotting module 134 and a rendering module 136 for execution by the client computer. The parallel coordinates plotting module 134 and rendering module 136 can cooperate with each other during execution to generate a parallel coordinates graph for display such as the example shown by FIG. 8. Parallel coordinates plotting module 134 can be configured to generate plot data for use with the parallel coordinates graph (e.g., the module 134 can be configured to generate the parallel axes 800 and related data such as the range scale as axis labels 804). A number of software applications are available to be used as the parallel coordinates plotting module 134. For example, the open source library d3.js available at http://d3js.org/ may serve as the parallel coordinates plotting module 134. However, it should be understood that other software applications are also suitable for use as the parallel coordinates plotting module 134, including a number of open source libraries other than the d3.js library. Furthermore, if desired by a practitioner, a parallel coordinates plotting module 134 can be coded from scratch to generate the parallel coordinates plot data as shown by way of example in FIG. 8. The rendering module 136 can be configured to calculate and cause the display of the lines 802 for the parallel coordinates graph through the GUI.

The inventors have found that, for some example embodiments, the creation and rendering of the parallel coordinates graph by a client computer can be perceived by users as slow when the parallel coordinates graph is generated with respect to a large group of financial instruments. For example, in an example embodiment, the database 104 may include financial instrument data for over 20,000 financial instruments. If a user desires a parallel coordinates graph that plots criteria data values for all of these financial instruments, a long amount of time may be needed to render the parallel coordinates graph on the client computer. Similar problems can result for other large pools of financial instruments (e.g., parallel coordinates graphs for the constituent stocks of the S&P 500 or other large indexes or baskets of financial instruments). As a technical solution to this technical problem of perceived slow loading/rendering, the inventors disclose an example embodiment where the application 132 employs progressive rendering of the parallel coordinates graph. With progressive rendering, the application only renders portions of the parallel coordinates graph at a time such that the user can see the (partially rendered) parallel coordinates graph relatively immediately when compared with waiting for an entire parallel coordinates graph to be rendered. For example, portions of the parallel coordinates graph can be rendered at timed intervals such that after each timed interval another portion of the parallel coordinates graph is added to the display (until the complete parallel coordinates graph has been displayed).

An example embodiment for such progressive rendering is shown by FIG. 3. In this example, the application 132 includes a progressive rendering module 300 in cooperation with the parallel coordinates plotting module 134. The progressive rendering module 300 can be configured to receive the financial instrument data 130 sent by server 102 as well as any display parameters to be used in connection with the parallel coordinates graph presentation.

The parallel coordinates plotting module 134 can then operate on this information to generate a base parallel coordinates graph for rendering through the GUI. This base parallel coordinates graph may include the parallel axes 800 and labels for the various criteria 804 associated with the parallel axes in appropriate spaced relationships with each other on the graph. The parallel coordinates plotting module 134 can be configured to generate the parallel axes 800 for this base parallel coordinates graph such that each parallel axes includes a range scale of data values appropriate for that parallel axis' associated criteria. To compute these range scales, the parallel coordinates plotting module 134 can determine the range of criteria data values for all of the financial instruments in the financial instrument data 130 (e.g. find the maximum and minimum values for each set of criteria data values for the financial instruments). Based on this range, the parallel coordinates plotting module can define the criteria data values for the ends 806 of each parallel axis 800 and also define the scaled criteria data values along the long dimension of each parallel axis 800.

Figure 4:
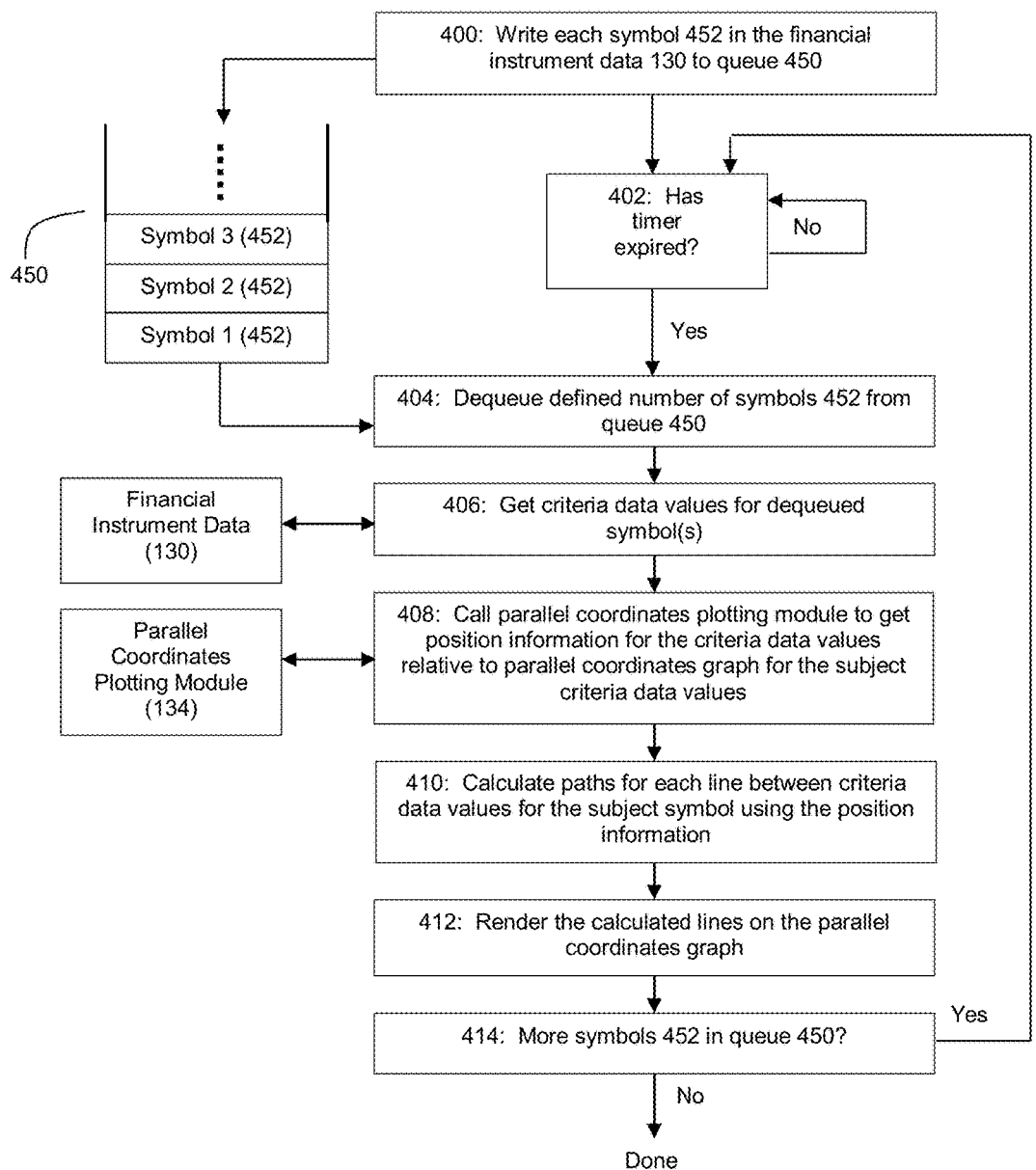
FIG. 4 depicts an example process flow for progressive rendering of a parallel coordinates chart in accordance with an example embodiment.

The progressive rendering module 300 can be configured to progressively render the lines 802 corresponding to the various financial instruments within financial instrument data 130 for overlay on this base parallel coordinates graph. FIG. 4 depicts an example embodiment for a process flow for execution by the progressive rendering module 300. In this example, the progressive rendering module 300 includes a queue 450 in which data indicative of the various financial instruments within financial instrument data 130 are queued. For example, a symbol 452 for each such financial instrument can be enqueued in queue 450. The progressive rendering module 300 can be configured to read symbols 452 from this queue 450 at timed intervals to govern when and which lines 802 are to be rendered on the base parallel coordinates graph at a given time.

For example, as shown by FIG. 4, at step 400, a processor that executes the progressive rendering module 300 writes each symbol 452 in the financial instrument data 130 to queue 450.

At step 452, the processor that executes the progressive rendering module 300 maintains a timer and checks whether the timer has expired (step 402). If the timer has not expired, the process flow remains at step 402. If the timer has expired, the process flow proceeds to steps 404-414 whereupon the processor that executes the progressive rendering module 300 operates to generate lines for a portion of the parallel coordinates graph. The timed interval that governs timer expiration at step 402 can be a programmed value that corresponds to an amount of time deemed suitable by a practitioner for avoiding user perception of slow loading/rendering of the parallel coordinates graph. For example, the timer can be configured to expire every 17 milliseconds whereupon the progressive rendering module 300 will perform the rendering for the lines 802 of 100 stocks, to thereby define a render rate that will render the lines for 100 stocks every 17 ms. However, it should be understood that this is merely an example and a practitioner may wish to employ other timer values and/or numbers of lines to be rendered for each timed interval.

At step 404, the processor that executes the progressive rendering module 300 dequeues a defined number of symbols 452 from queue 450. As indicated above, the defined number is set at a value that, in combination with the timer value, causes the render rate for the progressive rendering module 300 to avoid a user perception of slow loading/rendering for the parallel coordinates graph. Continuing with the example above, 100 symbols 452 can be dequeued from queue 450 at step 404. However, once again, it should be understood that other defined numbers could be used (e.g., if the timer interval is set sufficiently low, step 404 might only dequeue 1 symbol for each timed interval). It should also be understood that if fewer than the defined number of symbols 452 are present in queue 450, then step 404 can operate to dequeue all of the symbols 452 in the queue 450. Queue 450 can be arranged as a first in first out (FIFO) queue, although it should be understood that other queue arrangements could be employed.

At step 406, the processor that executes the progressive rendering module 300 obtains the criteria data values within the financial instrument data 130 for the financial instrument(s) corresponding to the dequeued symbol(s) 452. If these criteria data values are not already resident in the memory accessible by the processor (e.g., not present in memory 112), the processor can execute a web server application programming interface (API) within application 132 to obtain those criteria data values from the server 102.

At step 408, the processor that executes the progressive rendering module 300 calls the parallel coordinates plotting module 134 to get position information relative to the base parallel coordinates graph for the criteria data values obtained at step 406. For example, in a 2-dimensional display area whose positions can be identified by x,y coordinates, the base parallel coordinates graph will exhibit the parallel axes 800 at known coordinates, and with the known range scales for each parallel axis 800, the parallel coordinates plotting module can readily compute the coordinates within the parallel coordinates graph for each criteria data value. Thus, at step 408, the processor that executes the progressive rendering module 300 can provide the parallel coordinates plotting module 134 with the criteria data values for the financial instrument(s) corresponding to the dequeued symbol(s) 452 and then receive from the parallel coordinates plotting module 134 the coordinates within the parallel coordinates graph for each criteria data value.

At step 410, the processor that executes the progressive rendering module 300 calculates the paths for each line 802 connecting the criteria data values of the financial instrument(s) corresponding to the dequeued symbol(s) 452. Given that the progressive rendering module 300 will know the coordinates of the end points for each line 802, it can compute the coordinates for the portions of the graph area that will constitute the line connecting these end points. These are the coordinates that will be rendered as a line 802 on the parallel coordinates graph.

At step 412, the processor that executes the progressive rendering module 300 renders the lines 802 based on the coordinates determined at steps 408 and 410 for display on the parallel coordinates graph. Thus, continuing the example from above where the parallel coordinates graph includes 8 parallel axes for 8 different criteria, step 412 will cause the display of 7 lines 802 for each financial instrument of the dequeued financial instruments on the parallel coordinates graph (a first line 802 extending from the axis 800 for Criteria 1 (at the coordinates in the display area corresponding to the criteria data value of that financial instrument for Criteria 1) to the adjacent parallel axis for Criteria 2 (at the coordinates in the display area corresponding to the criteria data value of that financial instrument for Criteria 2), a second line 802 extending from the axis 800 for Criteria 2 (at the coordinates in the display area corresponding to the criteria data value of that financial instrument for Criteria 2) to the adjacent parallel axis for Criteria 3 (at the coordinates in the display area corresponding to the criteria data value of that financial instrument for Criteria 3), a third line 802 extending from the axis 800 for Criteria 3 (at the coordinates in the display area corresponding to the criteria data value of that financial instrument for Criteria 3) to the adjacent parallel axis for Criteria 4 (at the coordinates in the display area corresponding to the criteria data value of that financial instrument for Criteria 4), a fourth line 802 extending from the axis 800 for Criteria 4 (at the coordinates in the display area corresponding to the criteria data value of that financial instrument for Criteria 4) to the adjacent parallel axis for Criteria 5 (at the coordinates in the display area corresponding to the criteria data value of that financial instrument for Criteria 5), a fifth line 802 extending from the axis 800 for Criteria 5 (at the coordinates in the display area corresponding to the criteria data value of that financial instrument for Criteria 5) to the adjacent parallel axis for Criteria 6 (at the coordinates in the display area corresponding to the criteria data value of that financial instrument for Criteria 6), a sixth line 802 extending from the axis 800 for Criteria 6 (at the coordinates in the display area corresponding to the criteria data value of that financial instrument for Criteria 6) to the adjacent parallel axis for Criteria 7 (at the coordinates in the display area corresponding to the criteria data value of that financial instrument for Criteria 7), and a seventh line 802 extending from the axis 800 for Criteria 7 (at the coordinates in the display area corresponding to the criteria data value of that financial instrument for Criteria 7) to the adjacent parallel axis for Criteria 8 (at the coordinates in the display area corresponding to the criteria data value of that financial instrument for Criteria 8)).

At step 414, the processor that executes the progressive rendering module 300 checks queue 450 to determine whether there is a remaining symbol 452 queued therein. If not, the rendering is complete, and the process flow ends. If so, the process flow returns to step 402 where it awaits timer expiration. Through these timed intervals, the process flow of FIG. 4 regulates the amount of rendering that needs to be performed at a given time, which the parallel coordinates graph displays in a partially completed state, thereby permitting the user to view the partially completed parallel coordinates graph rather than forcing the user to wait to view the parallel coordinates graph until line 802 for all of the subject financial instruments have been rendered. This may permit the user to interact with the parallel coordinates graph in its partially rendered state rather than forcing the user to wait to interact with the graph until all lines 802 have been overlaid on the graph.

While the example of FIG. 4 shows that the parallel coordinates graph is progressively rendered by a controlled rate of generating lines 802 on a financial instrument group-by-financial instrument group basis, it should be understood that the progressive rendering can be configured to progressively render other portions of the parallel coordinates graph. For example, different portions of the criteria data value pairs for adjacent criteria 804 of the various financial instruments could be queued in queue 450, in which case the progressive rendering of lines 802 need not be designed to render all lines 802 for a given financial instrument before proceeding to render all lines 802 for another financial instrument. Instead, the progressive rendering module 300 could be configured to successively render lines 802 of different financial instruments if desired. Thus, it should be understood that the progressive rendering engine could be configured to progressively render any portion of the parallel coordinates graph if desired by a practitioner.

Returning to FIGS. 1 and 3, in an example embodiment, the content 124 can be delivered from the server 102 to the client computer 106 in the form of JavaScript (e.g., application 132 may take the form of JavaScript), Cascading Style Sheets (CSS), images, APIs, and HTML. As shown by FIGS. 1 and 3, the content 124 may also include the financial instrument data 130 retrieved from database 104 by server 102. While for the sake of convenience, the illustrations of FIGS. 1 and 3 show these aspects of content 124 sharing the same box, it should be understood that the server 102 may deliver portions of such content 124 to the client computer 106 at different times. Thus, the server 102 may first deliver HTML to the client computer 106 that includes the JavaScript application 132, CSSs, APIs, and images, whereupon a browser executed by the client computer 106 executes this content portion to create a GUI such as the one shown in FIG. 6 based on this portion of the content 124. This content portion may include web server APIs that then interact with the server 102 to obtain financial instrument data 130 from database 104 that is responsive to a request submitted by a user through the GUI. Based on the interactions through such web server APIs, the server 102 can then deliver the financial market data 130 to the client computer 106.

In an example embodiment, the content 124 can define the display area on the display screen 120 for the parallel coordinates graph using an HTML5<canvas> element (instead of the classic HTML <svg> element). Relative to the <svg> element, the <canvas> element when used in combination with the application 132 to render the parallel coordinates graph allows for much faster rendering because it is completely JavaScript-based (no actual Document Object Model (DOM) elements are created). FIGS. 19A and 19B show an example code snippet that illustrates how the canvas element may be used in this regard. By contrast, the <svg> element adds every item to be rendered to the DOM so they can be manipulated by JavaScript and CSS, which becomes very slow when there are many items to render as in the case of a parallel coordinates graph for a large number of financial instruments. The <canvas> element provides a simple graphics API and draws the pixels on the screen only. While this causes the application 132 to re-draw the parallel coordinates graph each time there is a change made to the graph, the <canvas> element still allows for much faster rendering in many use cases where thousands of lines 802 may need to be drawn.

Figure 5:
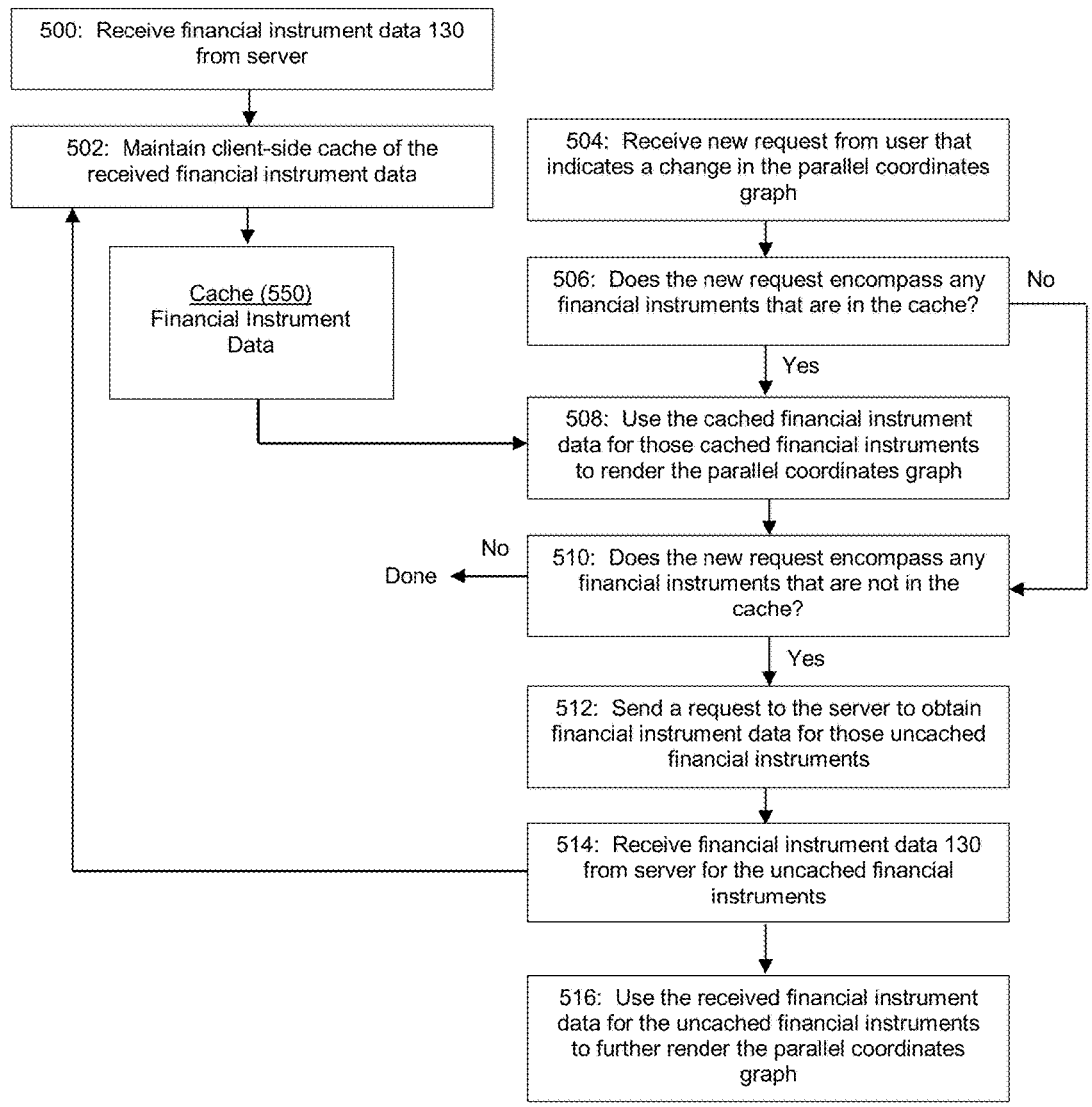
FIG. 5 depicts an example process flow for client-side caching of financial instrument data in connection with the rendering of a parallel coordinates chart in accordance with an example embodiment.

In another example embodiment, client-side caching can be employed to reduce the network footprint of the system 100 and reduce the load on server 102. FIG. 5 depicts an example process flow that can be included as part of application 132 in this regard. Application 132 can include instructions that cause the client computer 106 to maintain a cache 550 in its memory 112. When the client computer receives financial instrument data 130 from the server 102 (step 500), the processor that executes application 132 adds this financial instrument data to the cache 550 (step 502). Thereafter, the application 132 seeks to render the parallel coordinates graph using cached financial instrument data whenever possible.

At step 504, a new request is received from a user through the GUI that indicates a change has been requested for the parallel coordinates graph. This change may include a request to add one or more financial instruments to the parallel coordinates graph.

At step 506, the processor that executes application 132 checks the cache 550 to see if any of the financial instruments encompassed in the new request have financial instrument data therefor stored in the cache. If not, the process flow proceeds to step 510. If the cache does include such financial instrument data, the processor that executes application 132 processed to step 508 where it retrieves the financial instrument data for such financial instrument(s) from the cache 550 and uses this cached financial instrument data to render the parallel coordinates graph. Thus, the cache 550 in combination with steps 506 and 508 reduce the load on network 108 (and server 102) because the client computer need not re-request new financial instrument data each time a change is made to the parallel coordinates graph.

At step 510, the processor that executes application 132 determines whether there are any financial instruments encompassed by the request received at step 504 that are not accounted for in the cache 550. If all of the request's financial instruments are found in the cache, then the process flow can conclude because there is no need to obtain new financial instrument data. However, if there are financial instruments encompassed by the request that are not present in cache 550, then the process flow proceeds to step 512. At step 512, the processor that executes application 132 generates a request regarding the uncached financial instruments, and the client computer 106 sends this request to the server 102 via network 108. Upon receipt of this request, the server 102 can retrieve the financial instrument data for these uncached financial instruments from database 104 and return the retrieved financial instrument data to the client computer 106 via network 108. At step 514, the client computer receives this new financial instrument data. In turn, this new financial instrument data is added to the cache (step 502), and the processor that executes application 132 uses this newly received financial instrument data to render the parallel coordinates graph (step 516).

It should be understood that the client computer can be configured to purge cache 550 on a periodic basis. For example, in an embodiment where the financial instrument data is updated within database 104 on a daily basis (e.g., overnight), the client computer can likewise purge the cache 550 on a daily basis (e.g., overnight).

Also, it should be understood that while the example process flow of FIG. 5 describes a technique for detecting when requests include financial instruments for which financial instrument data is already present in the cache 550, this process flow arrangement can also be used to detect situations where a new request includes new criteria for which financial instrument data is not stored in the cache. For example, if the cache includes criteria data values for the S&P 500 stocks with respect 3 criteria (price, dividend yield, and EPS), but the user chooses to add another criteria to the mix (e.g., a request for a parallel coordinates graph that plots the S&P 500 stocks with respect to price, dividend yield, and ROA (thereby adding ROA to the criteria mix)), the process flow of FIG. 5 can also be configured to detect that criteria data values for the S&P 500 stocks are already present in the cache 550 with respect to price, dividend yield, and EPS, but the server needs to be asked for ROA data with respect to the S&P 500 stocks. Thus, the parallel coordinates graph can be rendered using the cached data for the S&P 500 stocks with respect to price, dividend yield, and EPS and using newly received ROA data from the server for the S&P 500 stocks. Similarly, the process flow of FIG. 5 can also be configured to detect changes in both the financial instrument makeup and criteria makeup of a requested parallel coordinates graph, and then leverage the cache 550 accordingly to reduce the network traffic and server load.

FIGS. 6-18B depict example embodiments regarding various features that may be included in stock screener visualization GUIs that present the parallel coordinates graph to users. The GUI of FIG. 6 shows a number of different sections of the GUI that can be used for different purposes.

Figures 13, 14, 15, 16:
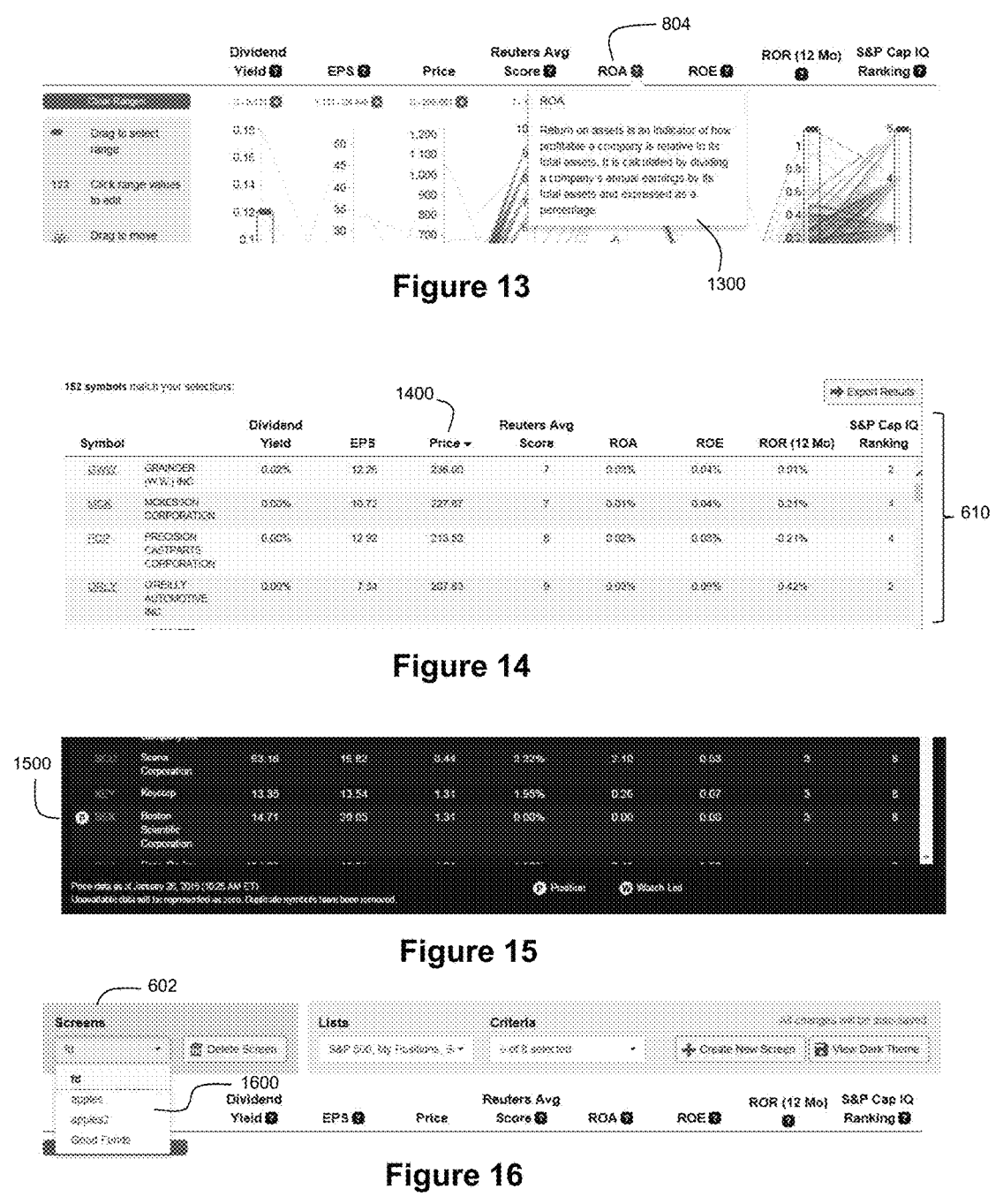

For example, a section 602 can be included in the GUI that permits the user to identify a particular "screen" of stocks that is to be presented. The GUI can be configured to permit the user to save past screen configurations (e.g., prior selections of stock lists, criteria, etc.), which can then be retrieved at a later date. For example, FIG. 16 shows an example GUI where section 602 includes a drop down menu 1600 that includes a list of previously created stock screens for the user. Upon user selection of one of the listed stock screens, the GUI will be updated to present a parallel coordinates graph for the stocks and criteria defined by the selected stock screen. Returning to FIG. 6, if a user wishes to create a new stock screen, he or she can select the "Create New Screen" button 614 (whereupon the user can be prompted to provide a name for the new screen, such name to be used for later identifying the screen through drop down menu 1600). Further still, the system 100 may be configured if desired by a practitioner to permit various users to authorize the sharing of their stock screens with other users, in which case the criteria selections and other configurations employed by successful traders can be disseminated to other traders.

Figure 6:
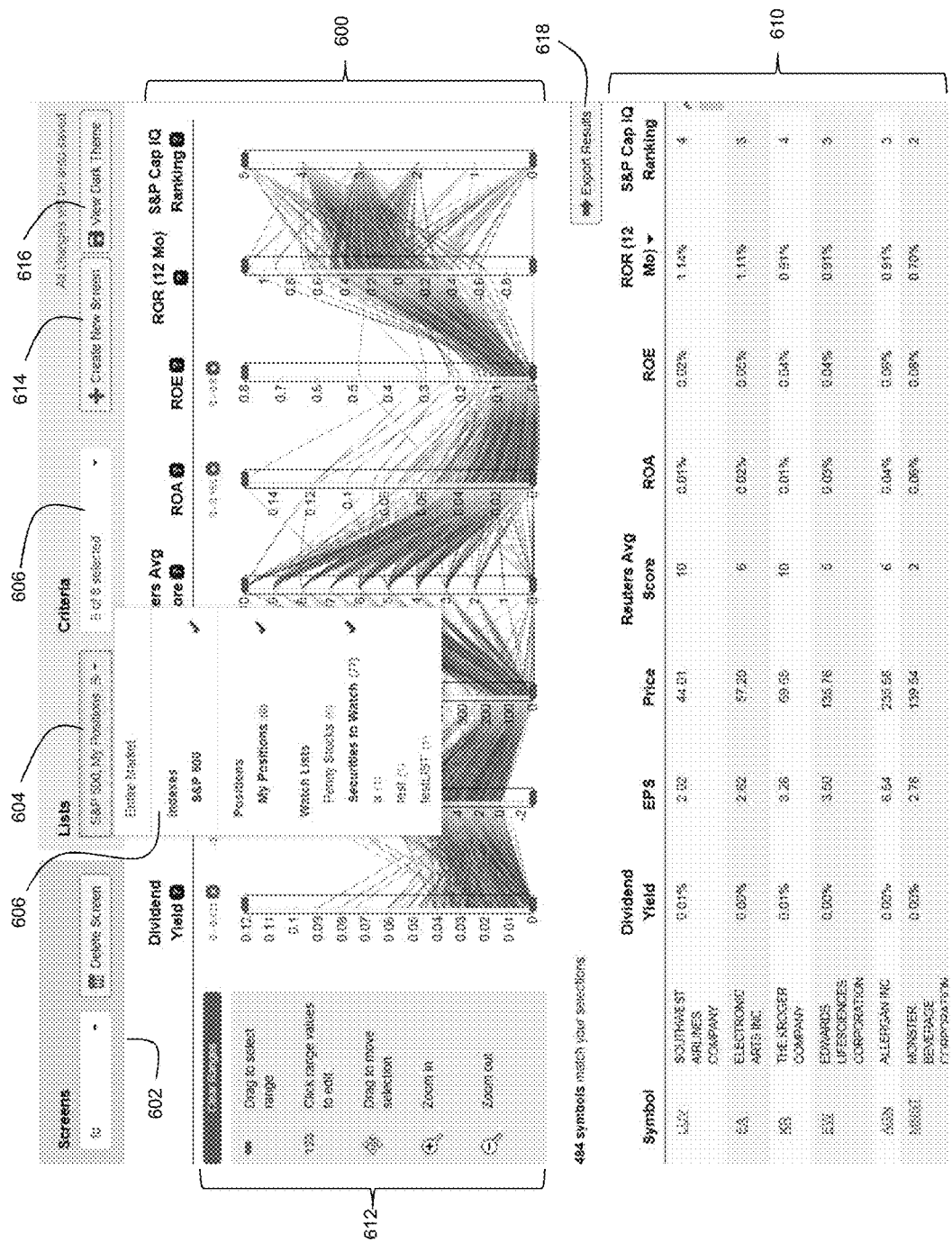

The GUI of FIG. 6 also shows a section 604 through which the user can define the stocks to be included in the parallel coordinates graph. A drop down menu 606 can be presented to the user that lists a number of user-selectable options for baskets of stocks. These options may include a basket corresponding to the entire market of stocks, a basket corresponding to the stocks of any of a number of well-known stock indexes (such as the S&P 500, NASDAQ, Dow Jones Industrial Average, Russell 2000, etc.), baskets that correspond to the stocks within the portfolio of the user (see the "My Positions" option), and baskets that correspond to the stocks on a watch list for the user. Furthermore, the GUI can be configured to provide a tool that permits a user to create new baskets that are populated with user-selected stocks. These new baskets can then be added to the list of options available through menu 606. In an example embodiment, the GUI can be configured to select multiple basket options from the menu 606 at a time in response to user input, so that the resultant parallel coordinates graph would encompass all of the stocks included within the selected baskets.

Figure 7:
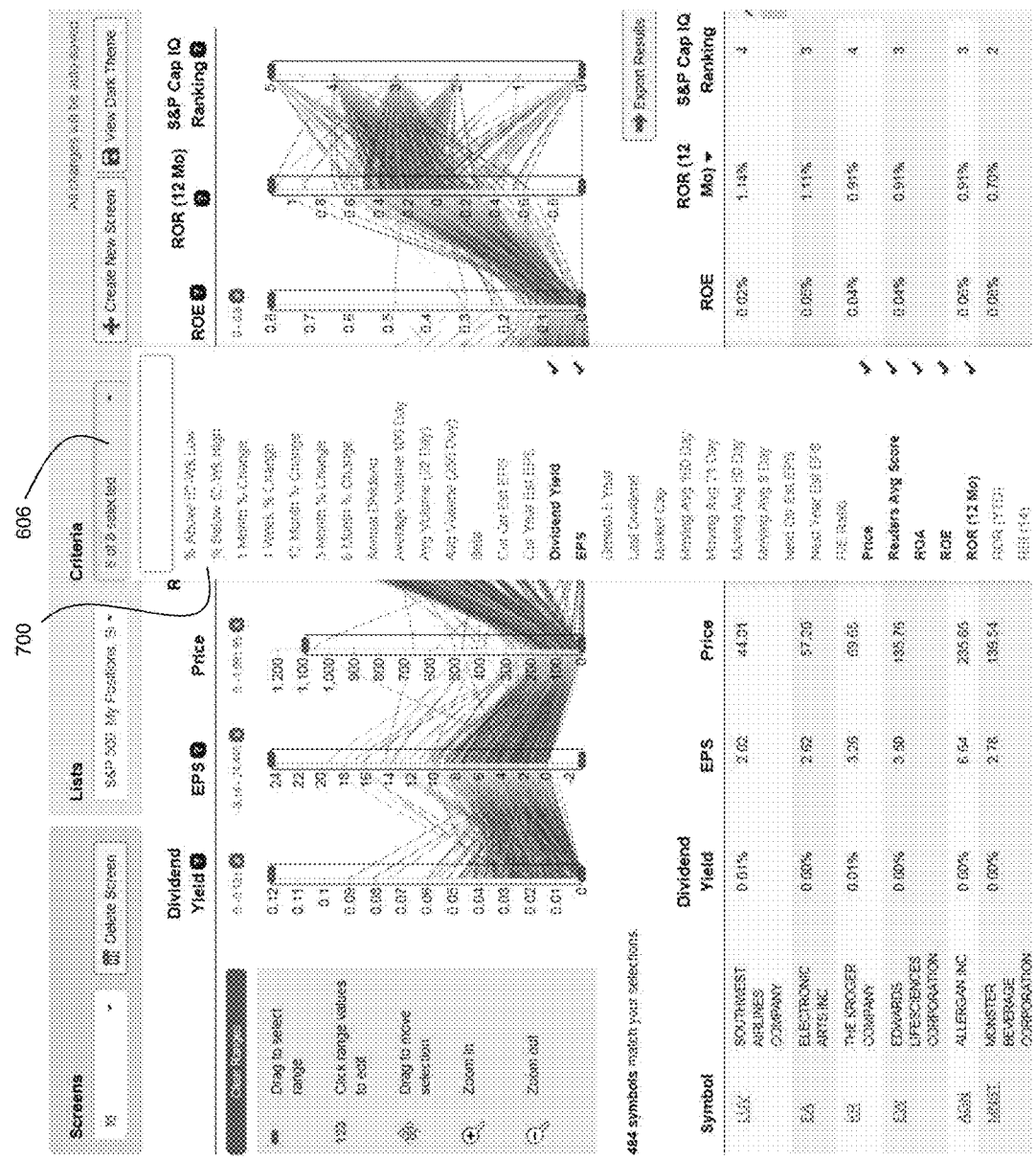

The GUI of FIG. 6 also shows a section 606 through which the user can define the criteria of interest for the stocker screener visualization (where these criteria of interest are the criteria 804 used for the parallel coordinates graph). As shown by the example of FIG. 7, section 606 can include a drop down menu 700 that lists the criteria available for selection by a user. These criteria can include any of a number of well-known criteria by which people evaluate stocks. Furthermore, the GUI can be configured to select multiple criteria from the menu 700 at a time in response to user input, so that the resultant parallel coordinates graph would include parallel axes 800 for all of the criteria selected within menu 700.

In response to a selection by the user of one or more baskets from menu 606 of the GUI and multiple criteria from menu 700 of the GUI, the processor that executes application 132 can formulate a request for transmission to the server (e.g., request 122) that includes an identification of the stocks included within the selected basket(s) and an identification of the selected criteria. Also, as noted above, in an example embodiment where client-side caching is employed, this request may omit the stocks and/or criteria for which stock data is already stored in cache 550.

Figure 9A:
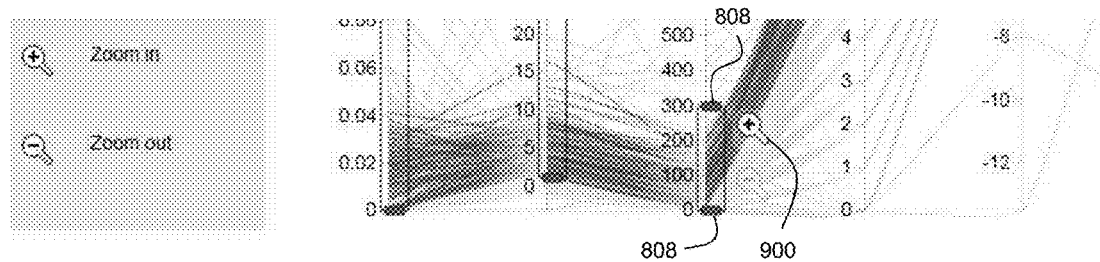
Figure 9B:
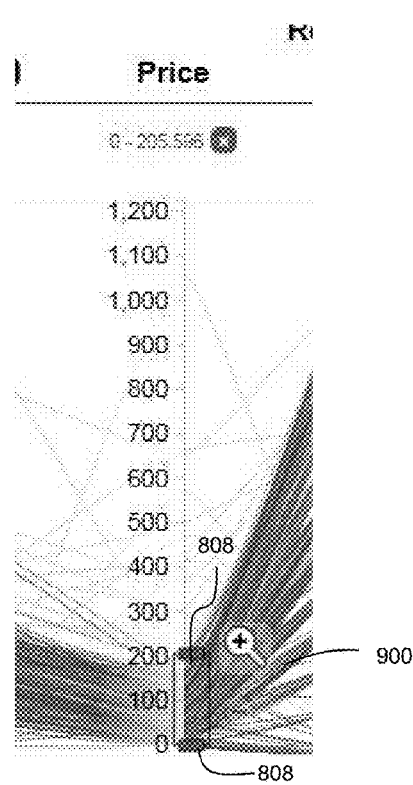
Figure 9C:
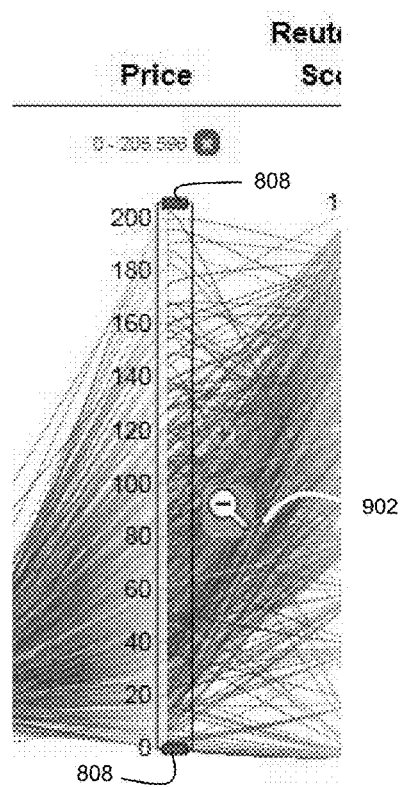
Figure 10:
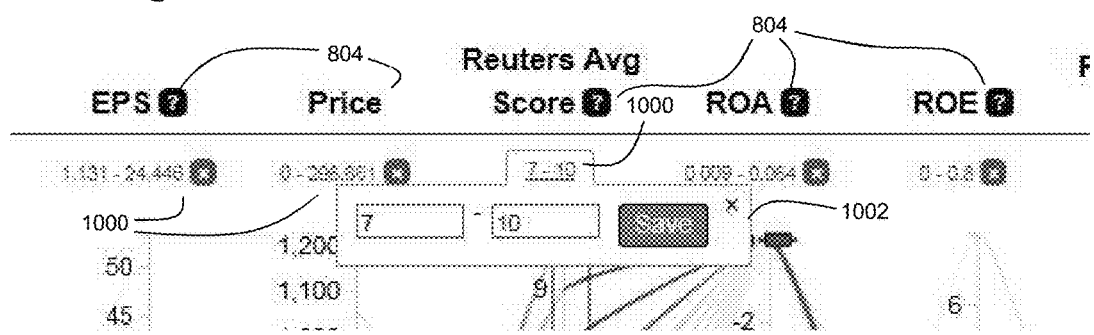

The GUI of FIG. 6 also shows the section 600 in which the parallel coordinates graph is displayed, and FIG. 8 shows an unobstructed view of section 600. The parallel coordinates graph that is displayed in section 600 may include a number of user input tools as shown in connection with the example of FIG. 8. For example, each parallel axis 800 may include user-selectable handles 808 that be selected by a user and dragged to narrow or widen the range of data values encompassed by the handles 808 of that axis 800. When the handles 808 are used to adjust these ranges, the colors of the lines 802 can be adjusted such that the lines 802 that correspond to stocks whose lines 802 are still within the range defined by the handles 808 are presented in a different color than the stocks whose lines 802 fall outside the range defined by the handles to thereby highlight the stocks whose lines 802 are within the range defined by the handles. This highlighting may be configured such that the highlighting is limited to those stocks for which all of its lines 802 are within the ranges defined by handles 808. Also, user-selectable icons such as magnifying glasses can be provided for a user to zoom in via tool 900 shown in FIGS. 9A and 9B (or zoom out via tool 902 shown in FIG. 9C) from an area of the parallel coordinates graph, thereby giving the user finer control over setting the ranges defined by the handles 808 (as shown by FIGS. 9A-C). An alternative technique for defining the ranges encompassed by handles 808 may include the use of a user-interactive label associated with each parallel axis 800 that identifies the range of data values encompassed by a given axis 800, as shown by the text below the criteria labels 804. Upon user selection of one of these areas of the GUI, a user entry field area 1000 such as that shown by FIG. 10 can be presented to the user. This area 1000 can include user entry fields for a user to type in the minimum and maximum data values for the range to be encompassed by the handles 808 of the subject parallel axis 800. Further still, the GUI can be configured to receive user input that causes the parallel coordinates graph to re-order the parallel axes 800 within the graph. For example, a user can be permitted to drag the Dividend Yield parallel axis 800 to the right so that the EPS parallel axis 800 will be positioned in the leftmost position while the Dividend Yield parallel axis is positioned in the second leftmost position. In the absence of user-selection of how the parallel axes are to be ordered, the GUI can use a system-defined default ordering. Also, the criteria labels 804 can be user-selectable to display an explanation about the subject criteria (see explanation window shown by FIG. 13 that can be displayed when a user selects the ROA criteria label 804). Further still, in an example embodiment, the lines 802 for the stocks can be color coded based on the sector for each stock if desired by a practitioner. Also, in an example embodiment, functional hooks can be provided by a parallel coordinates plotting module 134 such as the d3.js library to allow user interactions with the parallel coordinates graph in these fashions.

Returning to FIG. 6, the GUI can also include a section 612 that serves as a toolbar displaying tools that can be selected by a user to activate the corresponding tools for user interaction with the parallel coordinates graph.

The GUI of FIG. 6 can also include a section 610 that provides an alternate view of the financial instrument data plotted by the parallel coordinates graph in section 600. In the example of FIG. 6, section 610 includes a table view of this financial instrument data. Because of the large size of this table in many use cases, progressive rendering techniques can also be used to improve how the table is rendered in the GUI and reduce user-perception of slow loading. In this regard, in an example embodiment, the application 132 can be configured to cause the client computer to only render a subset of table rows at a time (e.g., 20 table rows at a time) to facilitate faster user interactions. Furthermore, infinite scrolling techniques can be used to only load the table rows that correspond to the table rows the user is currently viewing, which also contributes to faster perceived loading times. Also, the "Export Results" button 618 can be selected by a user to export the table data in a format that can be used by another program (such as a spreadsheet format that can be processed using tools such as Microsoft Excel).

Figure 11:

Each stock that is listed in the table of section 610 can be selected by a user through the GUI to cause the presentation of additional information about that stock. An example is shown by FIG. 11 which shows a popup window 1102 (e.g., a quick quote window) that shows a variety of additional information about the selected Southwest Airlines stock 1100. This additional information can be requested from the database 104 via server 102 using web server APIs within application 132. The window 1102 can also include a "Trade" button 1104, where user selection of the "Trade" button will be effective to call another program that permits the user to generate a trade order for the subject stock.

Figure 12:
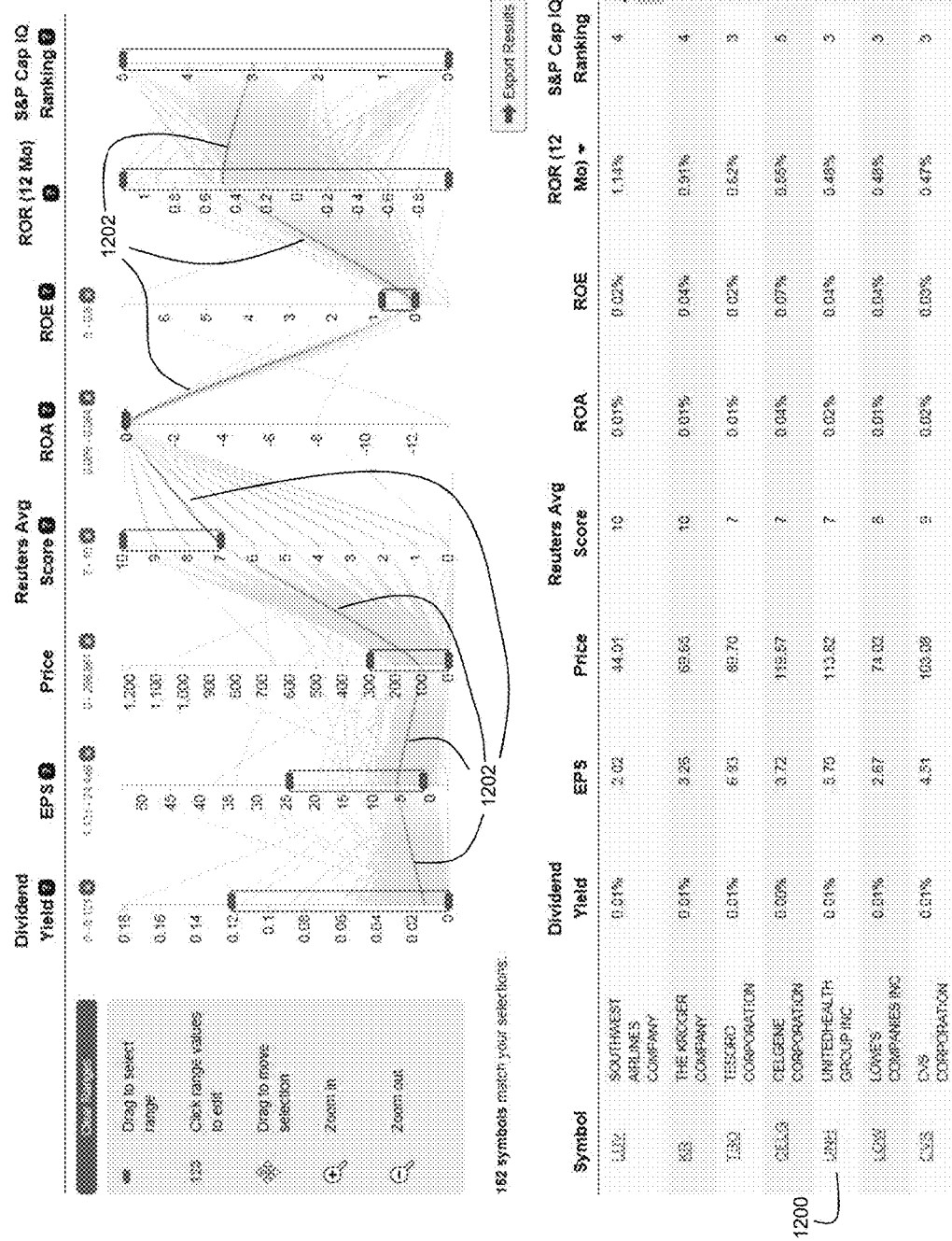

Further still, in an example embodiment, the GUI can be configured to permit a user to perform an action such as a hover mouse action over a stock listed in the table of section 610 to cause the lines 802 corresponding to the subject stock to be highlighted within the parallel coordinates graph (see FIG. 12, which shows the highlighted lines 1202 in the parallel coordinates graph that correspond to the United Health Group Inc. stock 1200).

Furthermore, it should be understood that a user can be permitted to select any of the column headers in the table of section 610 (where these column headers correspond to different ones of the user-selected criteria) to sort the table by the criteria data values for that column header (e.g., in an ascending or descending order). An example is shown by FIG. 14, which shows the table rows being sorted by the price values in the price column header 1400.

Figure 18A:
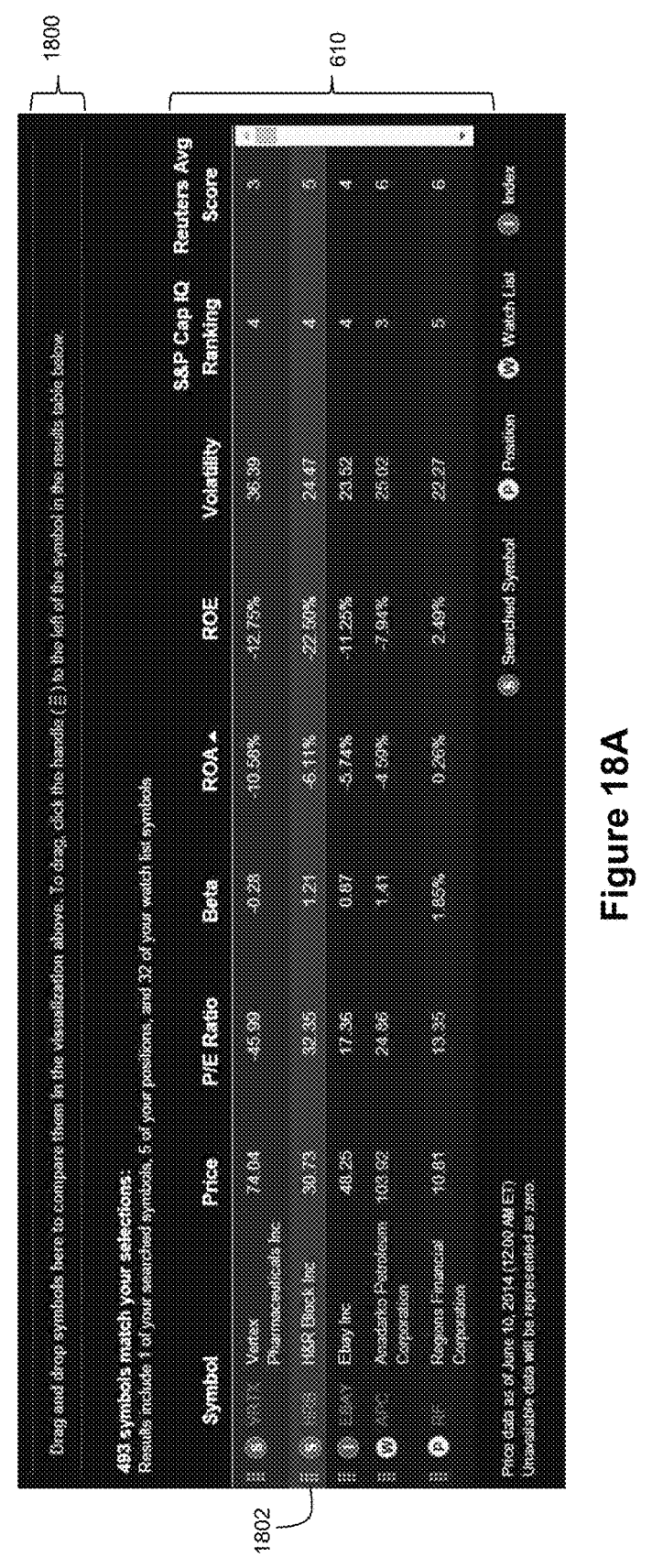
Figure 18B:
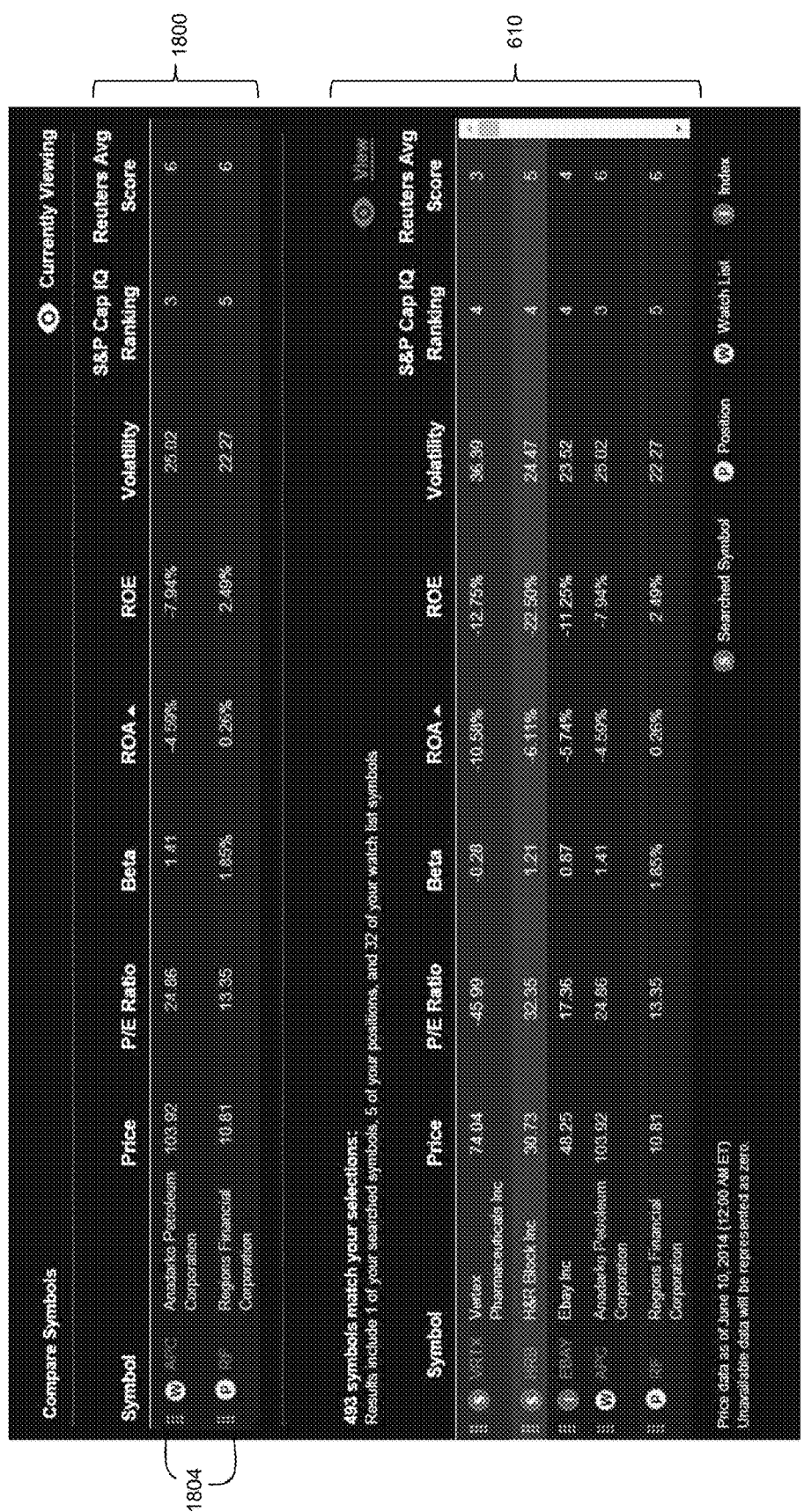

Furthermore, as shown by the example of FIG. 15, the stocks listed in the table of section 610 can include indicia 1500 for each stock to indicate a further categorization of the stock such as indicia that identifies the listed stock as being present in the user's portfolio, included in the user's watch list, and the like (see FIG. 15; see also FIGS. 18A and 18B). FIG. 15 also illustrates an alternate color scheme that can be employed by the GUI, where the GUI includes a dark background as opposed to a light background. Control over this aspect of the GUI display can be provided through the "View Dark Theme" button 616 shown by FIG. 6.

Figure 17:
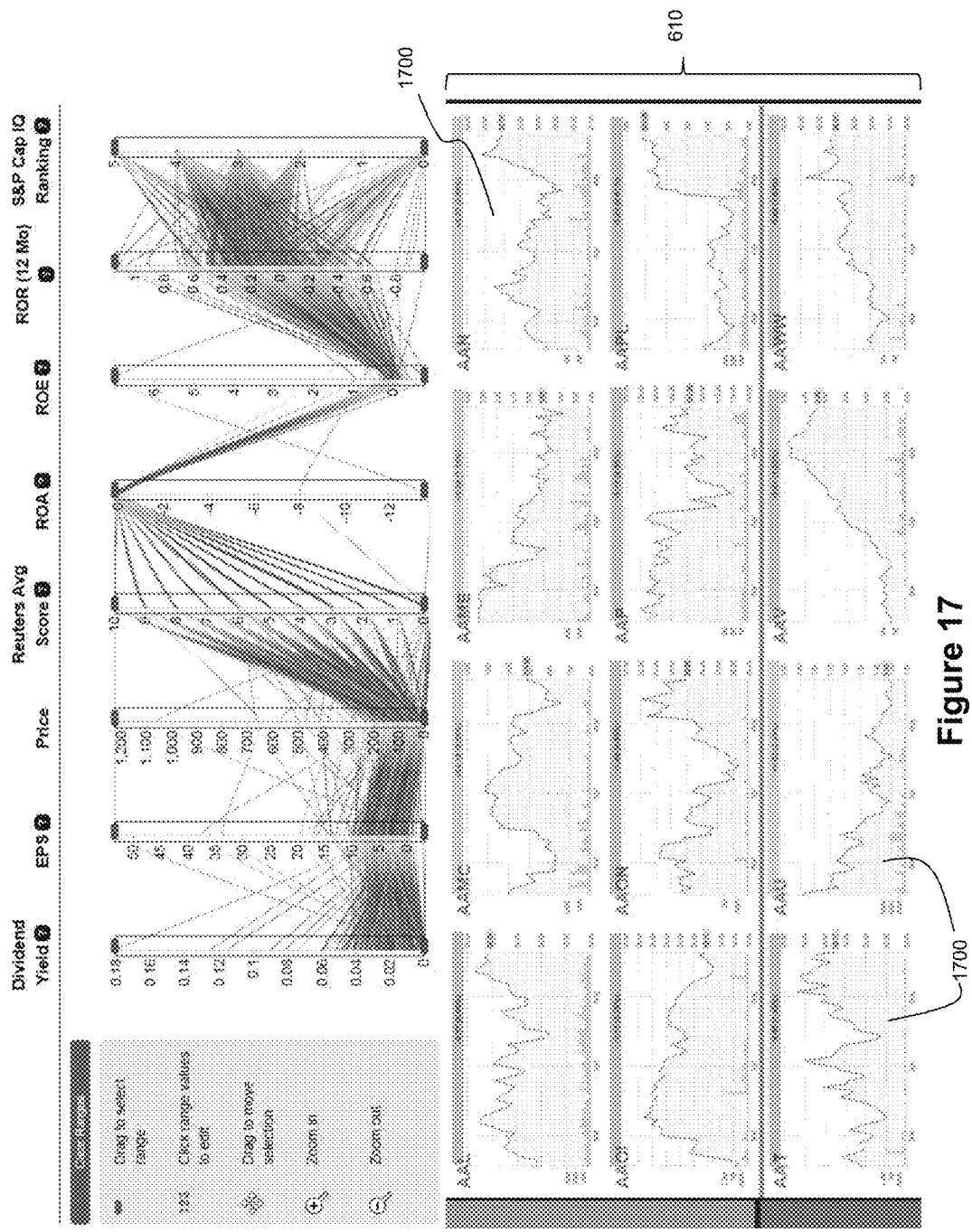

FIG. 17 shows an example GUI portion where the alternate view of the stock data shown within section 610 is a grid view of the subject stocks rather than a table view of the stock data. This grid view can include a number of tiles 1700 corresponding to each stock, and each tile can be configured to include a chart that plots some aspect of the stock data. Further still, in another example embodiment, the grid/chart view of the stock screen results in section 610 can also include an overlay of current market conditions on each chart if desired by a practitioner.

According to yet another example embodiment, the parallel coordinates graph can also be configured to overlay current market conditions on the GUI. For example, consider an example where the user has selected the NASDAQ as the pool of stocks of interest, and the user has selected price as one of the criteria. The parallel coordinates chart can include an overlay on the price axis 800 that shows the current real-time market value for the NASDAQ.

FIGS. 18A and 18B show example GUI portions where a section 1800 is included to provide a display area for a comparative view of selected stocks. As shown by FIG. 18A, a user can select and drag a stock listed in the table of section 610 (e.g., stock 1802) into section 1800 to add that stock to section 1800. Then, as shown by FIG. 18B, after the user has dragged multiple stocks 1804 into section 1800, section 1800 provides a comparative view of the criteria data values for these stocks by virtue of their adjacent positioning (whereas there may have been a large number of stocks between these stocks in the table view). It should also be understood that the lines 802 within the parallel coordinates graph for the stocks 1804 in section 1800 can be highlighted on the parallel coordinates graph to provide a still further comparative visual view of these stocks 1804.

Accordingly, through the example embodiments described herein, a high performance tool can be provided to users that leverages the visualization power of parallel coordinates graphs to graphically display various financial instruments with respect to a number of criteria in a flexible manner.

While the present invention has been described above in relation to example embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

What is claimed is:

1. A system comprising:
  a server for communication with a database and for communication with a client computer via a network, wherein the server includes a memory in which an application is stored; and
  the application, wherein the application is configured for execution by the client computer, and wherein the application comprises (1) a parallel coordinates plotting module, (2) a progressive rendering module that operates in cooperation with the parallel coordinates plotting module, and (3) a preprogrammed time interval for progressive rendering;
  wherein the server is configured to (1) communicate the application to the client computer via the network, (2) receive a request from the client computer via the network, wherein the request pertains to a plurality of financial instruments and a plurality of financial instrument criteria, and (3) based on the received request, (i) access the database to retrieve financial instrument data for the plurality of financial instruments and the plurality of financial instrument criteria, and (ii) communicate the retrieved financial instrument data to the client computer via the network; and wherein the application is configured to, upon execution by the client computer:

based on the received request, access a cache stored in a memory of the client computer, wherein the cache stores financial instrument data including financial instrument criteria;

in response to determining that the cache holds at least some of the requested financial instrument data, obtain, from the cache, stored financial instrument data that corresponds to the at least some of the requested financial instrument data;

obtain, from the cache, a set of stored criteria data values for the stored financial instrument data;

render, via the progressive rendering module, the stored financial instrument data on a parallel coordinates graph based at least in part on the set of stored criteria data values;

in response to determining that at least some of the requested financial instrument data is absent from the cache, obtain, from the client computer, remaining financial instrument data including the retrieved financial instrument data absent from the cache;

via the progressive rendering module, populate a queue with financial instrument identifiers for the remaining financial instrument data;

determine a first number indicating how many financial instruments can be rendered within the preprogrammed time interval;

dequeue, via the progressive rendering module, a set of financial instrument identifiers from the queue, wherein the set of financial instrument identifiers corresponds to a set of financial instruments that is a subset of financial instruments corresponding to the remaining financial instrument data, and wherein a size of the set of financial instrument identifiers is equal to the first number;

obtain, via the progressive rendering module, a set of criteria data values for the set of financial instruments from the remaining obtained financial instrument data;

render, via the progressive rendering module, the set of financial instruments on the parallel coordinates graph based at least in part on the set of criteria data values, wherein the rendering of the set of financial instruments causes the parallel coordinates graph to be displayed in a partially completed state that corresponds to the set of financial instruments; and in response to the queue being non-empty, repeat the dequeue, obtain, and render operations.

2. The system of claim 1, wherein the parallel coordinates graph includes a plurality of lines corresponding to the stored financial instrument data and the set of financial instruments.

3. The system of claim 1, wherein the server is further configured to:

generate hypertext markup language (HTML) that defines a graphical user interface (GUI) through which the parallel coordinates graph is presented on a computer display screen, wherein the HTML includes an HTML5<canvas> element that is configured to define a display area for the parallel coordinates graph; and communicate the generated HTML to the client computer.

4. The system of claim 1, wherein the application is further configured to, upon execution by the client computer, purge the cache after a programmed time period.

5. The system of claim 2, wherein:

the progressive rendering module is further configured to, upon execution by the client computer render the parallel coordinates graph in a defined area of a graphical user interface (GUI) for presentation on a computer display screen, the parallel coordinates graph includes a plurality of axes arranged in parallel, each axis of the plurality of axes includes (i) a long dimension, (ii) a first end, and (iii) a second end, for each axis of the plurality of axes, the first end and the second end are at opposite ends of the long dimension, each axis corresponds to a different one of the financial instrument criteria stored in the cache and the plurality of financial instrument criteria accessed in the database, each long dimension defines a scaled range of data values corresponding to a financial instrument criteria of a line of the plurality of lines, each line of the plurality of lines includes (i) a first end point corresponding to a data value for the financial instrument criteria of the line and (ii) a second end point corresponding to a data value for another financial instrument criteria of the line, and the plurality of lines connect to the plurality of axes within the defined scaled range of data values of each axis of the plurality of axes.

6. The system of claim 5 wherein the server is further configured to:

generate hypertext markup language (HTML) that defines the GUI, wherein the GUI is configured to (i) receive user input that adjusts the defined scaled range of data values of the plurality of axes on an axis-by-axis basis, and (ii) adjust the parallel coordinates graph based on the received adjusted scaled ranges.

7. The system of claim 2, wherein the server is further configured to:

generate hypertext markup language (HTML) that defines a graphical user interface (GUI) through which the parallel coordinates graph is presented on a computer display screen, wherein the GUI is configured to receive user input that defines the financial instruments and the financial instrument criteria to be included in the parallel coordinates graph; and communicate the generated HTML to the client computer.

8. The system of claim 2, wherein the server is further configured to:

generate hypertext markup language (HTML) that defines a graphical user interface (GUI) through which the parallel coordinates graph is presented on a computer display screen, wherein the GUI is configured to (i) receive user input indicative of a user selection of a financial instrument, and (ii) adjust the parallel coordinates graph to highlight the lines corresponding to the selected financial instrument; and communicate the generated HTML to the client computer.

9. The system of claim 1, wherein the server is further configured to:

generate HTML that defines a graphical user interface (GUI), wherein the GUI includes a first section in which the parallel coordinates graph is presented and a second section in which a table list view of the communicated financial instrument data is presented; and communicate the generated HTML to the client computer, wherein the progressive rendering module is further configured to, upon execution by the client computer, render the table list view of the communicated financial instrument data in the second section using infinite scrolling such that the progressive rendering module limits the rendering of the communicated financial instrument data to rows of the table list view presented on the GUI.

10. The system of claim 1, wherein the application is configured for execution through a browser of the client computer.

11. The system of claim 1 further comprising the client computer.

12. A computer program product comprising:
a plurality of processor-executable instructions resident on a non-transitory computer-readable storage medium, wherein the instructions are configured to, upon execution by a processor:
obtain stored financial instrument data stored in a cache for a first set of financial instruments and a first set of financial instrument criteria;
obtain a first set of criteria data values for the first set of financial instruments;
render the first set of financial instruments on a parallel coordinates graph based at least in part on the first set of criteria data values;
obtain financial instrument data for a second set of financial instruments and a second set of financial instrument criteria, wherein the second set of financial instruments are absent from the cache;
populate a queue with financial instrument identifiers corresponding one-to-one with the second set of financial instruments;
determine a first number indicating how many financial instruments can be rendered within a preprogrammed time interval;
dequeue a render set of financial instrument identifiers from the queue, wherein the render set of financial instrument identifiers corresponds to a render set of financial instruments that is a subset of the second set of financial instruments, and wherein a size of the render set of financial instrument identifiers is equal to the first number;
obtain a second set of criteria data values for the render set of financial instruments from the obtained financial instrument data;
render the render set of financial instruments on the parallel coordinates graph based at least in part on the second set of criteria data values, wherein the rendering of the render set of financial instruments causes the parallel coordinates graph to be displayed in a partially completed state that corresponds to the render set of financial instruments; and
in response to the queue being non-empty, repeat the dequeue, obtain, and render operations.

13. The computer program product of claim 12, wherein:
the instructions are further configured to, upon execution by the processor, render the parallel coordinates graph in a defined area of a graphical user interface (GUI) for presentation on a computer display screen,
the parallel coordinates graph includes (1) a plurality of axes arranged in parallel and (2) a plurality of lines corresponding to the first set of financial instruments and the second set of financial instruments,
each axis of the plurality of axes includes (i) a long dimension, (ii) a first end, and (iii) a second end,
for each axis of the plurality of axes, the first end and the second end are at opposite ends of the long dimension,
each axis corresponds to a different one of the first set of financial instrument criteria and the second set of financial instrument criteria,
each long dimension defines a scaled range of data values corresponding to a financial instrument criteria of a line of the plurality of lines,
each line of the plurality of lines includes (i) a first end point corresponding to a data value for the financial instrument criteria of the line and (ii) a second end point corresponding to a data value for another financial instrument criteria of the line, and
the plurality of lines connect to the plurality of axes within the defined scaled range of data values of each axis of the plurality of axes.

14. The computer program product of claim 12, wherein the instructions are further configured to, upon execution by the processor, purge the cache after a programmed time period.

15. The computer program product of claim 12, wherein an HTML5<canvas> element defines a display area of a graphical user interface (GUI) where the parallel coordinates graph is to be rendered.

16. The computer program product of claim 12, wherein the instructions are further configured for execution through a browser of a computer.

17. A method comprising:
at a server, retrieving, by at least one processor, financial instrument data from a database, wherein the retrieved financial instrument data pertains to a plurality of financial instruments and a plurality of financial instrument criteria; and
at the server, generating, by the at least one processor, hypertext markup language (HTML) that defines a graphical interface (GUI), the GUI including a code section that causes a client computer to:
obtain, from a cache, a set of stored criteria data values for stored financial instrument data;
render the stored financial instrument data on a parallel coordinates graph based at least in part on the set of stored criteria data values;
populate a queue with remaining financial instrument identifiers, wherein the remaining financial instrument identifiers include financial instrument identifiers absent from the cache;
determine a first number indicating how many financial instruments can be rendered within a preprogrammed time interval;
dequeue a set of financial instrument identifiers from the queue, wherein the set of financial instrument identifiers corresponds to a set of financial instruments that is a subset of financial instruments corresponding to the remaining financial instrument identifiers, and wherein a size of the set of financial instrument identifiers is equal to the first number;
obtain a set of criteria data values for the set of financial instruments from the retrieved financial instrument data;
render the set of financial instruments on the parallel coordinates graph based at least in part on the set of criteria data values, wherein the rendering of the set of financial instruments causes the parallel coordinates graph to be displayed in a partially completed state that corresponds to the set of financial instruments;
communicate, by the at least one processor, the generated HTML to the client computer to cause the client computer to display the GUI with the parallel coordinates graph on a display screen of the client computer; and in response to the queue being non-empty, repeat the dequeue, obtain, render, and communicate operations.

18. The method of claim 17, wherein the server includes an HTML5<canvas> element in the HTML to define a display area of the GUI where the parallel coordinates graph is to be rendered.

19. A computer-implemented method performed by at least one processor, the method comprising:
obtaining stored financial instrument data stored in a cache for a first set of financial instruments and a first set of financial instrument criteria;
obtaining a first set of criteria data values for the first set of financial instruments;
rendering the first set of financial instruments on a parallel coordinates graph based at least in part on the first set of criteria data values;
receiving a second set of financial instrument data, wherein the second set of financial instrument data pertains to a second set of financial instruments and a second set of financial instrument criteria, and wherein the second set of financial instruments are absent from the cache;
populating a queue with financial instrument identifiers corresponding one-to-one with the second set of financial instruments;
determining a first number indicating how many financial instruments can be rendered within a preprogrammed time interval;
dequeuing a render set of financial instrument identifiers from the queue, wherein the render set of financial instrument identifiers corresponds to a render set of financial instruments that is a subset of the second set of financial instruments, and wherein a size of the render set of financial instrument identifiers is equal to the first number;
obtaining a second set of criteria data values for the render set of financial instruments from the received financial instrument data;
rendering the render set of financial instruments on the parallel coordinates graph based at least in part on the second set of criteria data values, wherein the rendering of the render set of financial instruments causes the parallel coordinates graph to be displayed in a partially completed state that corresponds to the render set of financial instruments; and
in response to the queue being non-empty, repeating the dequeuing, obtaining, and rendering operations.

20. The system of claim 1, wherein the application is further configured to, upon execution by the client computer:
determine a range of criteria data values for the requested financial instrument data.

21. The system of claim 1, wherein the application is further configured to, upon execution by the client computer:
determine position information in the parallel coordinates graph based at least in part on the set of stored criteria data values and the set of criteria data values.

22. The system of claim 21, wherein the application is further configured to, upon execution by the client computer:
calculate a set of lines in the parallel coordinates graph based at least in part on the position information and the stored financial instrument data and the set of financial instruments.

23. The system of claim 22, wherein the application is further configured to, upon execution by the client computer:
render, via the progressive rendering module, the set of lines on the parallel coordinates graph.

* * * * *

UNITED STATES PATENT AND TRADEMARK OFFICE
CERTIFICATE OF CORRECTION

PATENT NO. : 10,510,117 B1
APPLICATION NO. : 14/665804
DATED : December 17, 2019
INVENTOR(S) : Justin Ryan Romo et al.

Page 1 of 1

It is certified that error appears in the above-identified patent and that said Letters Patent is hereby corrected as shown below:

In the Specification

Column 9, Line 31   "market" should be --instrument--

In the Claims

Claim 1, Column 15, Line 41   after "remaining", delete "obtained"

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*